US012802208B2

(12) United States Patent
Konno et al.

(10) Patent No.: US 12,802,208 B2
(45) Date of Patent: Nov. 17, 2026

(54) COMPUTER SYSTEM AND ANALYSIS METHOD

(71) Applicant: Hitachi High-Tech Corporation, Tokyo (JP)

(72) Inventors: Azusa Konno, Tokyo (JP); Ichiro Fujimura, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 358 days.

(21) Appl. No.: 18/685,981

(22) PCT Filed: Aug. 27, 2021

(86) PCT No.: PCT/JP2021/031595
§ 371 (c)(1),
(2) Date: Feb. 23, 2024

(87) PCT Pub. No.: WO2023/026489
PCT Pub. Date: Mar. 2, 2023

(65) Prior Publication Data
US 2024/0370992 A1 Nov. 7, 2024

(51) Int. Cl.
*G06T 7/00* (2017.01)

(52) U.S. Cl.
CPC ............ *G06T 7/001* (2013.01); *G06T 7/0008* (2013.01); *G06T 2207/10061* (2013.01); *G06T 2207/20104* (2013.01); *G06T 2207/30148* (2013.01)

(58) Field of Classification Search
CPC ......... G06T 7/0008; G06T 2207/10061; G06T 2207/20104; G06T 2207/30148;
(Continued)

(56) References Cited

U.S. PATENT DOCUMENTS 5,694,481 A * 12/1997 Lam ...................... G06F 30/398 382/294
8,442,300 B2 5/2013 Tsuneta et al.
(Continued)

FOREIGN PATENT DOCUMENTS

JP 2007-294391 A 11/2007
JP 2010-25836 A 2/2010
(Continued)

OTHER PUBLICATIONS

Japanese language Office Action issued in Japanese Application No. 2023-543624 dated Feb. 18, 2025 with English translation (12 pages).
(Continued)

*Primary Examiner* — Atiba O Fitzpatrick
(74) *Attorney, Agent, or Firm* — Crowell & Moring LLP

(57) ABSTRACT

A technique capable of easily and efficiently implementing determination and detection of an abnormality by comparison of similar cell structures in an observation image is provided. A computer system analyzes an observation image of a sample by a charged particle beam apparatus. The computer system executes an extraction process (Step S3) of extracting one or more second cell regions similar to a reference image as a similar image from the observation image, the reference image being a first cell region designated by a user or automatically set, a determination process (Step S6) of comparing, based on a rule in which a relationship between a plurality of regions of interest (ROIs) included in the reference image is defined, the plurality of ROIs between the reference image and the extracted similar image to determine presence or absence of an abnormality, and an output process (Step S7) of outputting, to the user, a position of each cell region and the presence or absence of the abnormality as a determination result.

7 Claims, 22 Drawing Sheets

(58) Field of Classification Search
CPC ....... G06T 7/00; G06T 7/0004; G06T 7/0006; G06T 2207/30108; G06T 2207/30141; G06T 2207/30152; G06T 7/0002–001; G06T 2207/20021; G01N 23/2251; G01N 2223/302; G01N 2223/304; G01N 2223/401; G01N 2223/418; G01N 2223/6116; G01N 2223/646; G01N 2223/611; G01N 2223/6113; G06V 10/25; G06V 10/50
See application file for complete search history.

(56) References Cited

U.S. PATENT DOCUMENTS

| | | | | |
|---|---|---|---|---|
| 8,853,628 | B2 | 10/2014 | Hosoya et al. | |
| 9,965,844 | B1 * | 5/2018 | Fang | G06T 7/0004 |
| 2005/0146714 | A1 * | 7/2005 | Kitamura | G06T 7/0004 356/237.2 |
| 2009/0045338 | A1 * | 2/2009 | Miyai | H01J 37/265 250/310 |
| 2009/0196490 | A1 * | 8/2009 | Matsumiya | G06T 7/001 382/149 |
| 2010/0303334 | A1 * | 12/2010 | Kitamura | H01J 37/265 382/141 |
| 2011/0077877 | A1 * | 3/2011 | Nikaido | G01R 31/307 324/501 |
| 2013/0010100 | A1 | 1/2013 | Kotaki et al. | |
| 2014/0193065 | A1 * | 7/2014 | Chu | G06T 7/0004 382/149 |
| 2014/0212024 | A1 * | 7/2014 | Chen | G06T 7/001 382/149 |
| 2016/0111248 | A1 | 4/2016 | Morita et al. | |
| 2021/0027455 | A1 * | 1/2021 | Kimizuka | H01J 37/28 |
| 2021/0027981 | A1 | 1/2021 | Kimizuka et al. | |
| 2021/0302155 | A1 | 9/2021 | Matsuda | |
| 2022/0138983 | A1 * | 5/2022 | Godo | G06T 7/001 382/145 |

FOREIGN PATENT DOCUMENTS

| | | | |
|---|---|---|---|
| JP | 2011-237375 | A | 11/2011 |
| JP | 2016-507058 | A | 3/2016 |
| JP | 2016-508295 | A | 3/2016 |
| JP | 2016-81907 | A | 5/2016 |
| JP | 2018-159577 | A | 10/2018 |
| JP | 2021-107807 | A | 7/2021 |
| WO | WO 2011/114644 | A1 | 9/2011 |
| WO | WO 2019/207668 | A1 | 10/2019 |
| WO | WO 2021/024402 | A1 | 2/2021 |

OTHER PUBLICATIONS

International Search Report (PCT/ISA/210) issued in PCT Application No. PCT/JP2021/031595 dated Nov. 16, 2021 with English translation (4 pages).
Japanese-language Written Opinion (PCT/ISA/237) issued in PCT Application No. PCT/JP2021/031595 dated Nov. 16, 2021 with English translation (5 pages).

* cited by examiner

[FIG. 1]
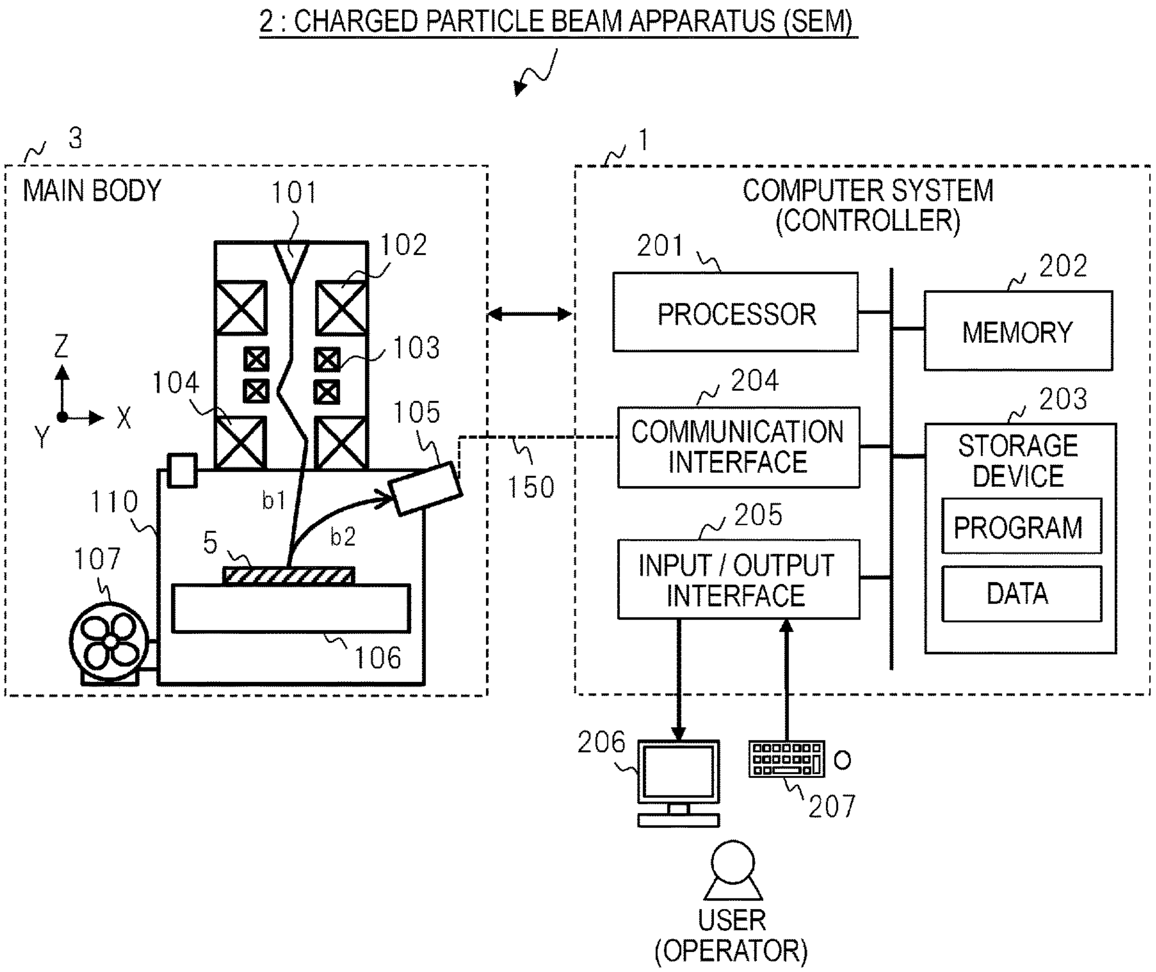

[FIG. 2]
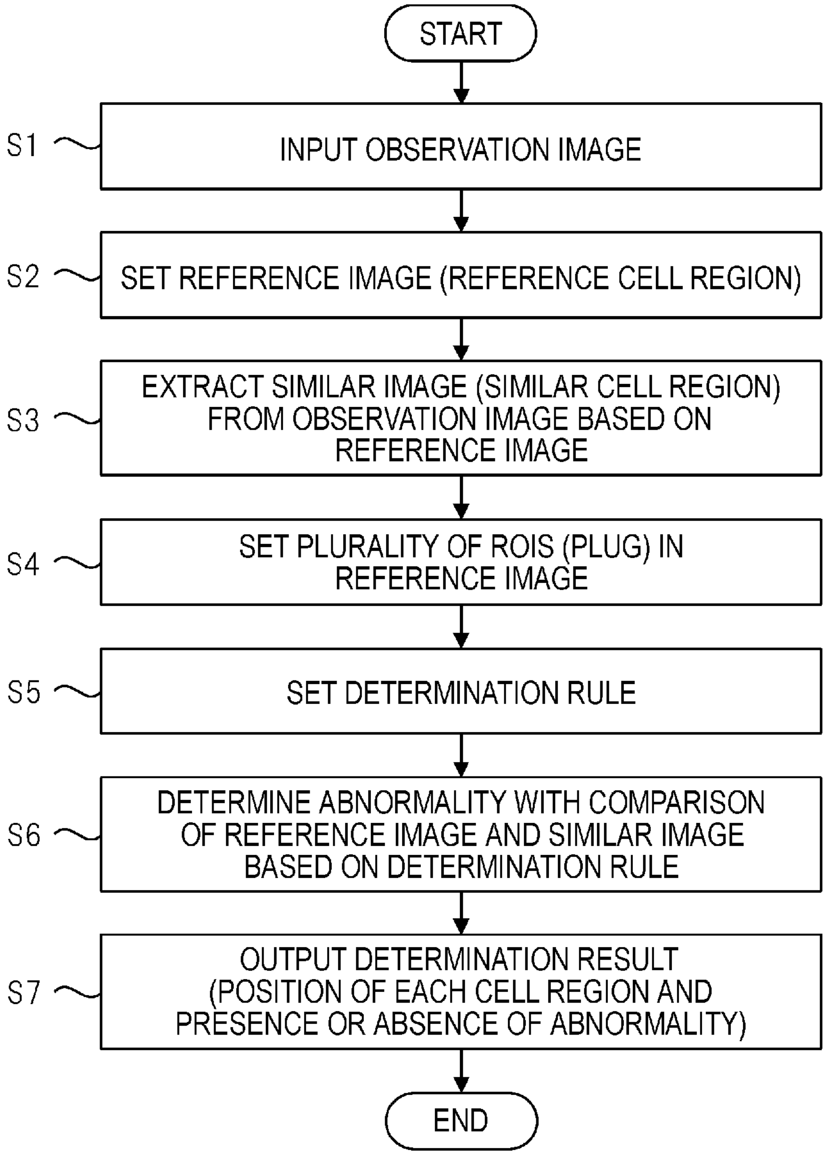

[FIG. 3]
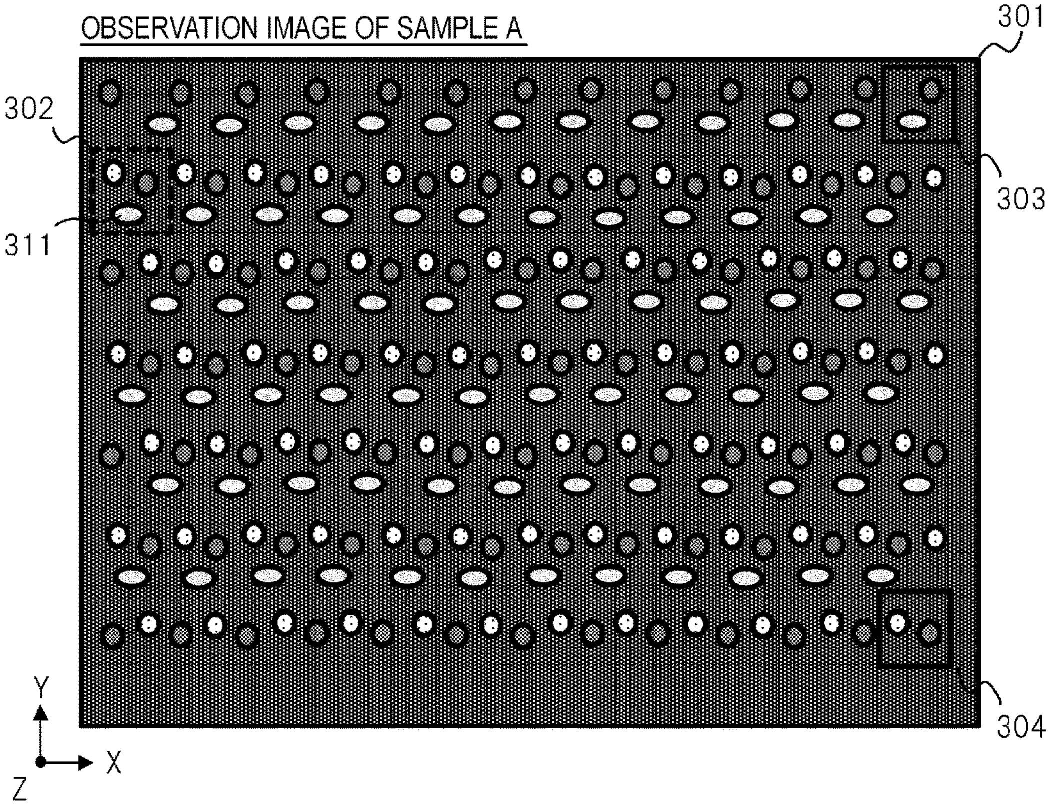
[FIG. 4]
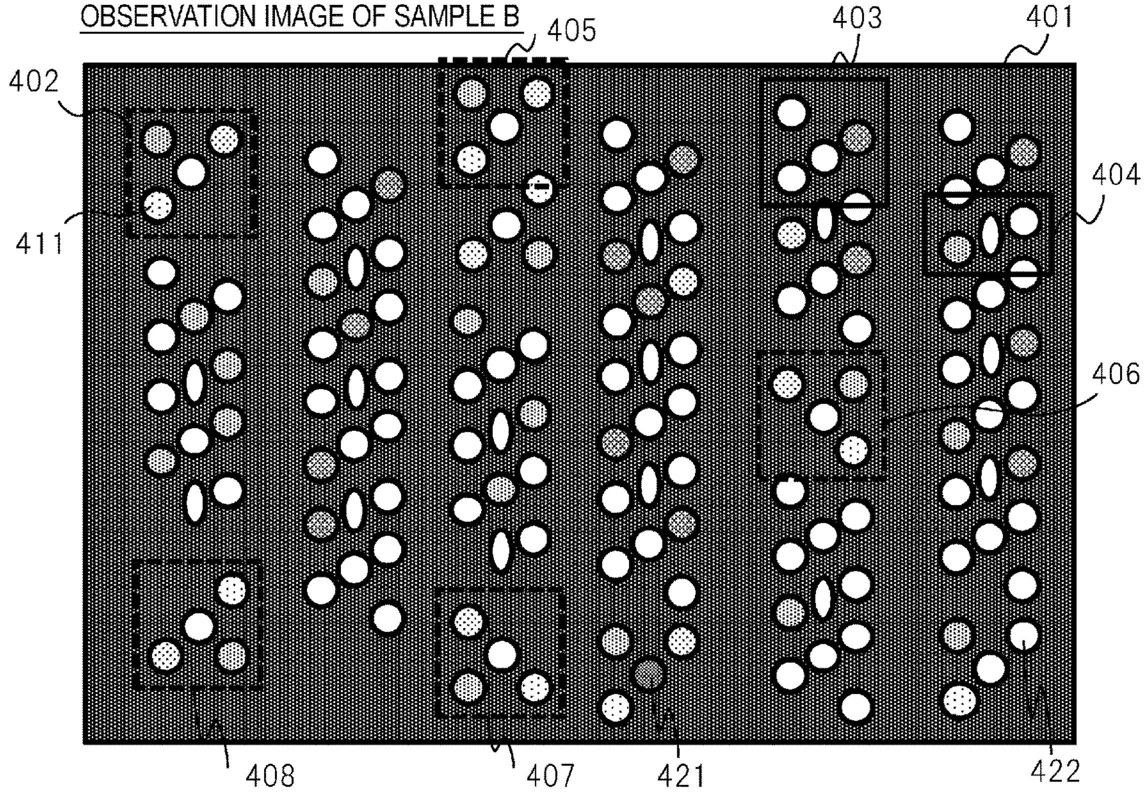

[FIG. 5]
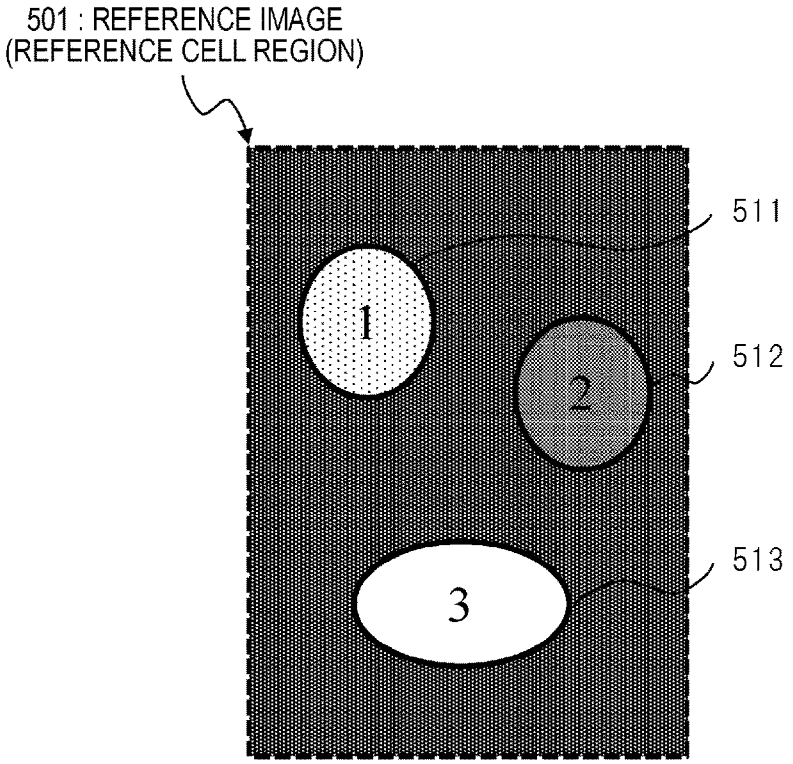
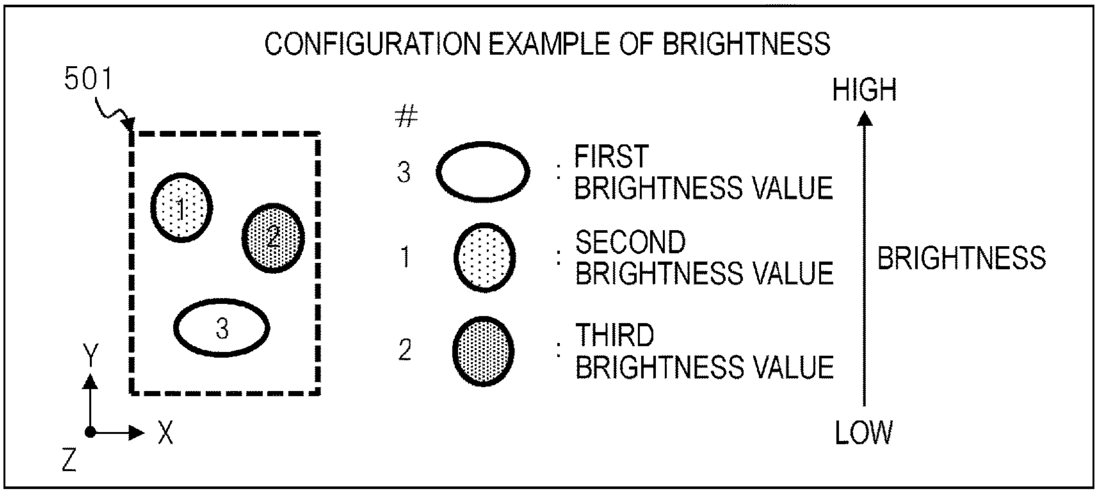

[FIG. 6]
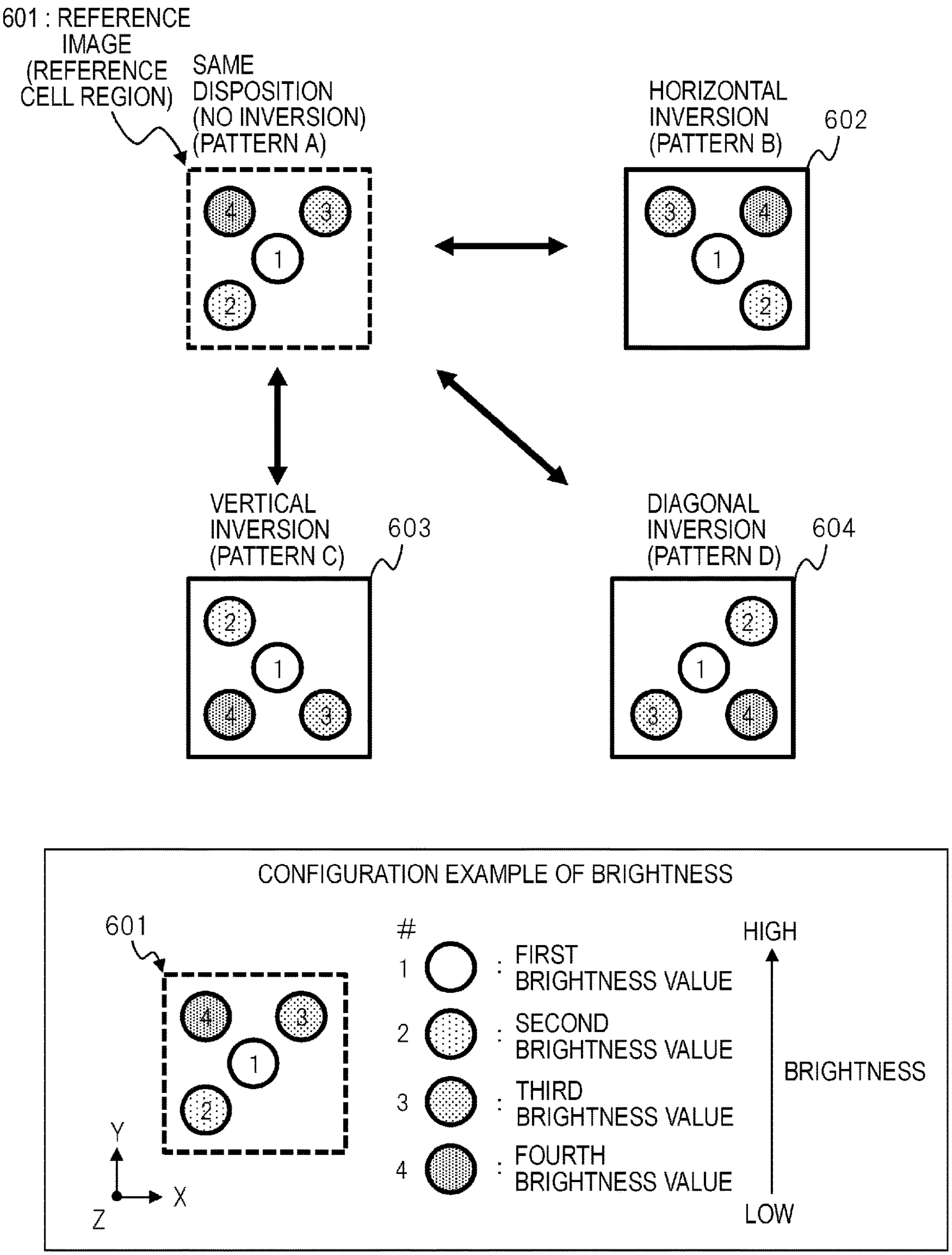

[FIG. 7]
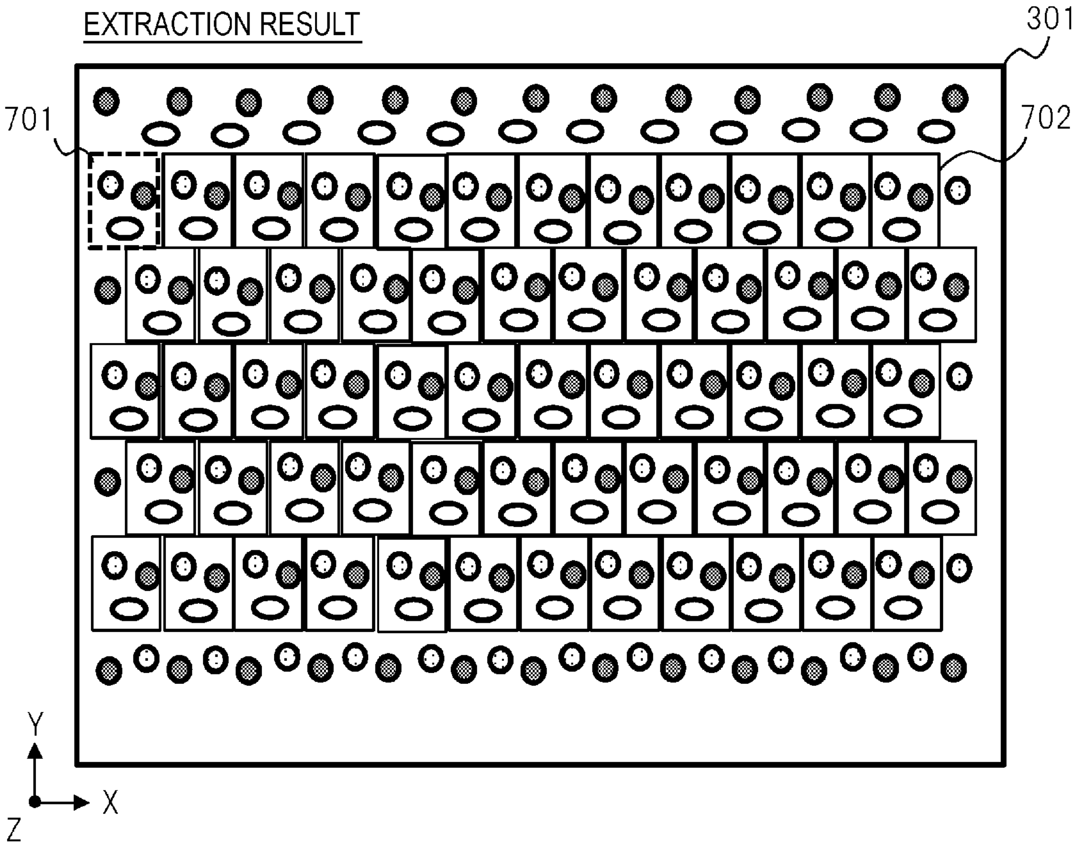

[FIG. 8]
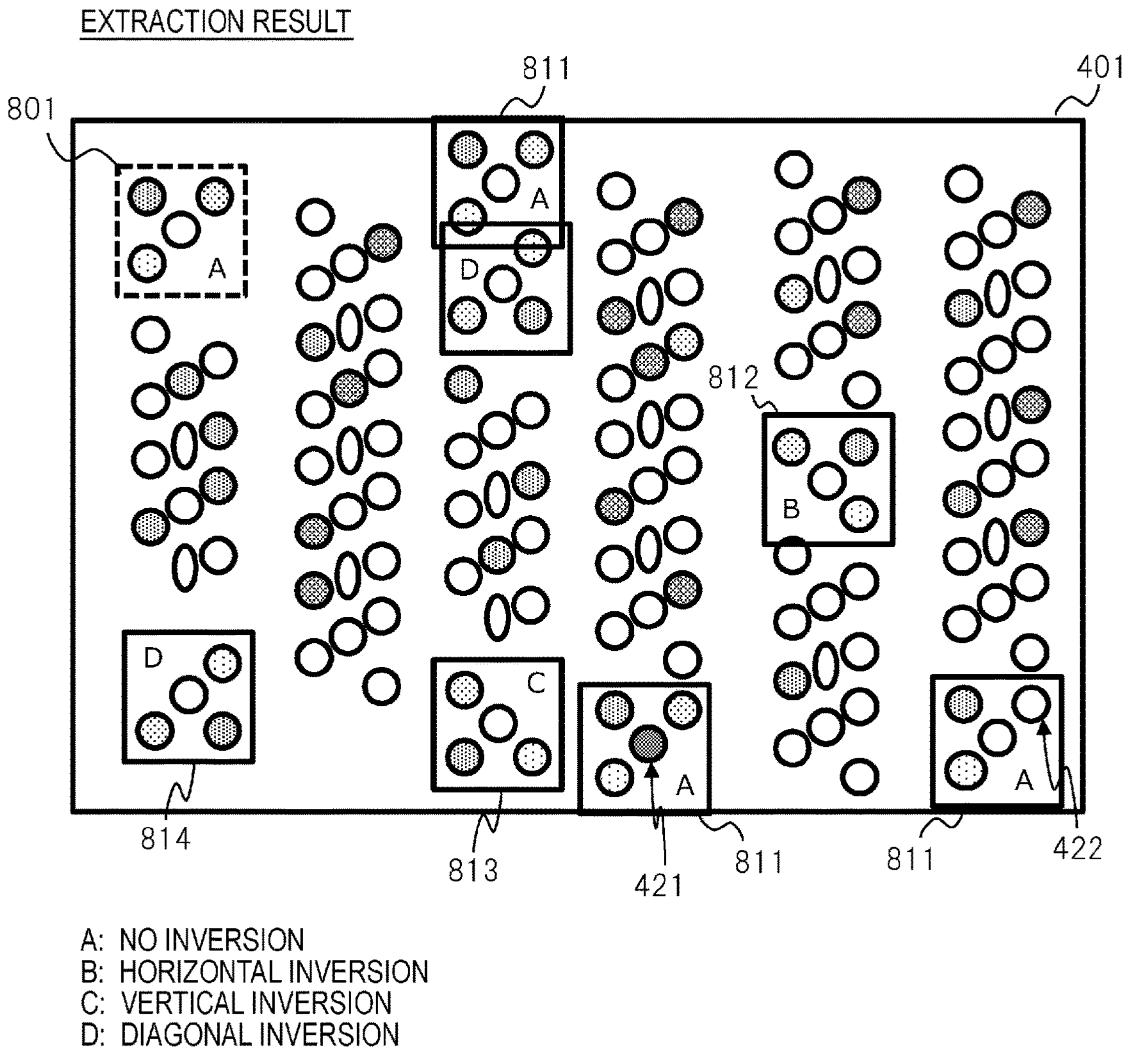

[FIG. 9]
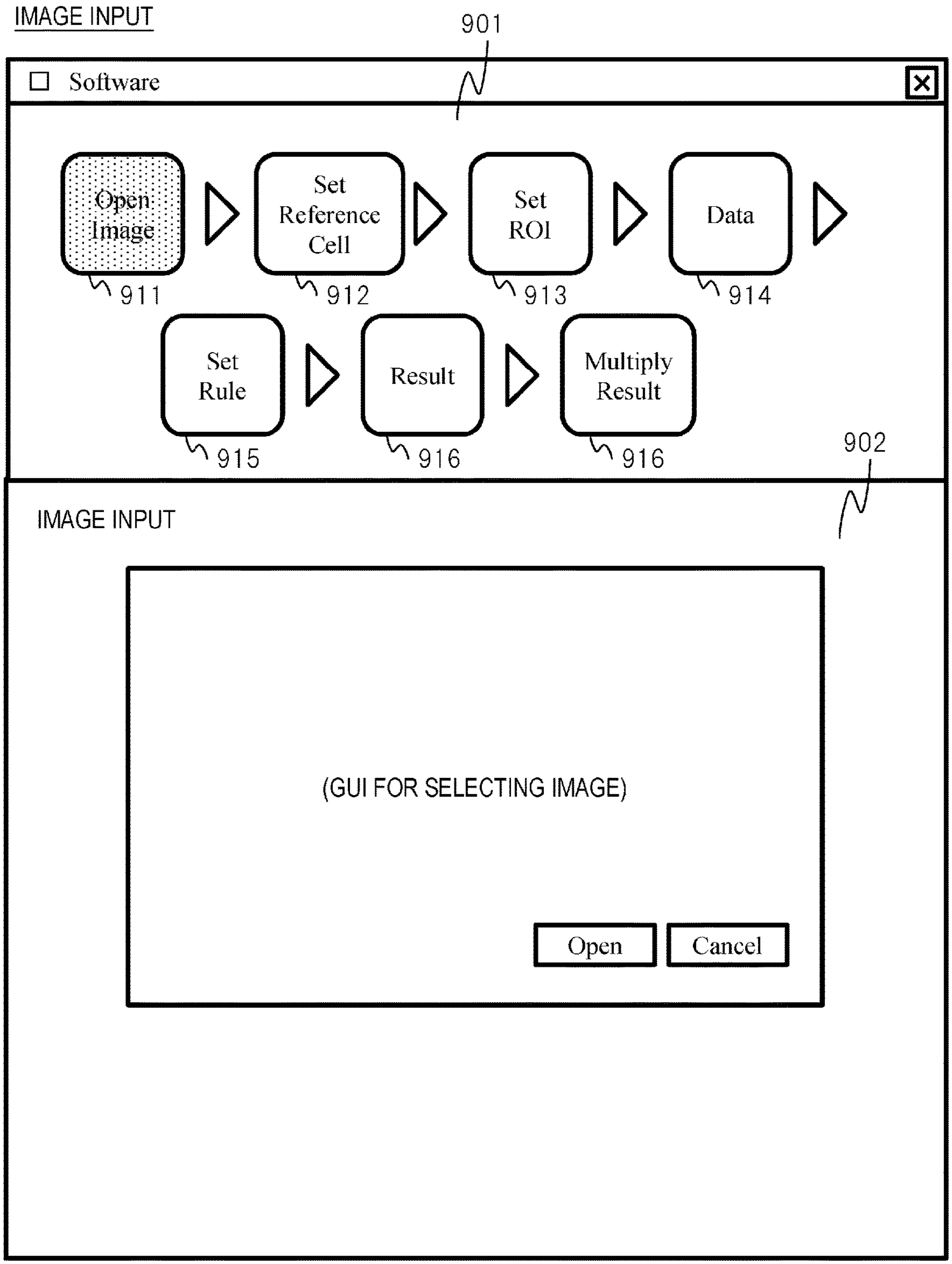

[FIG. 10]
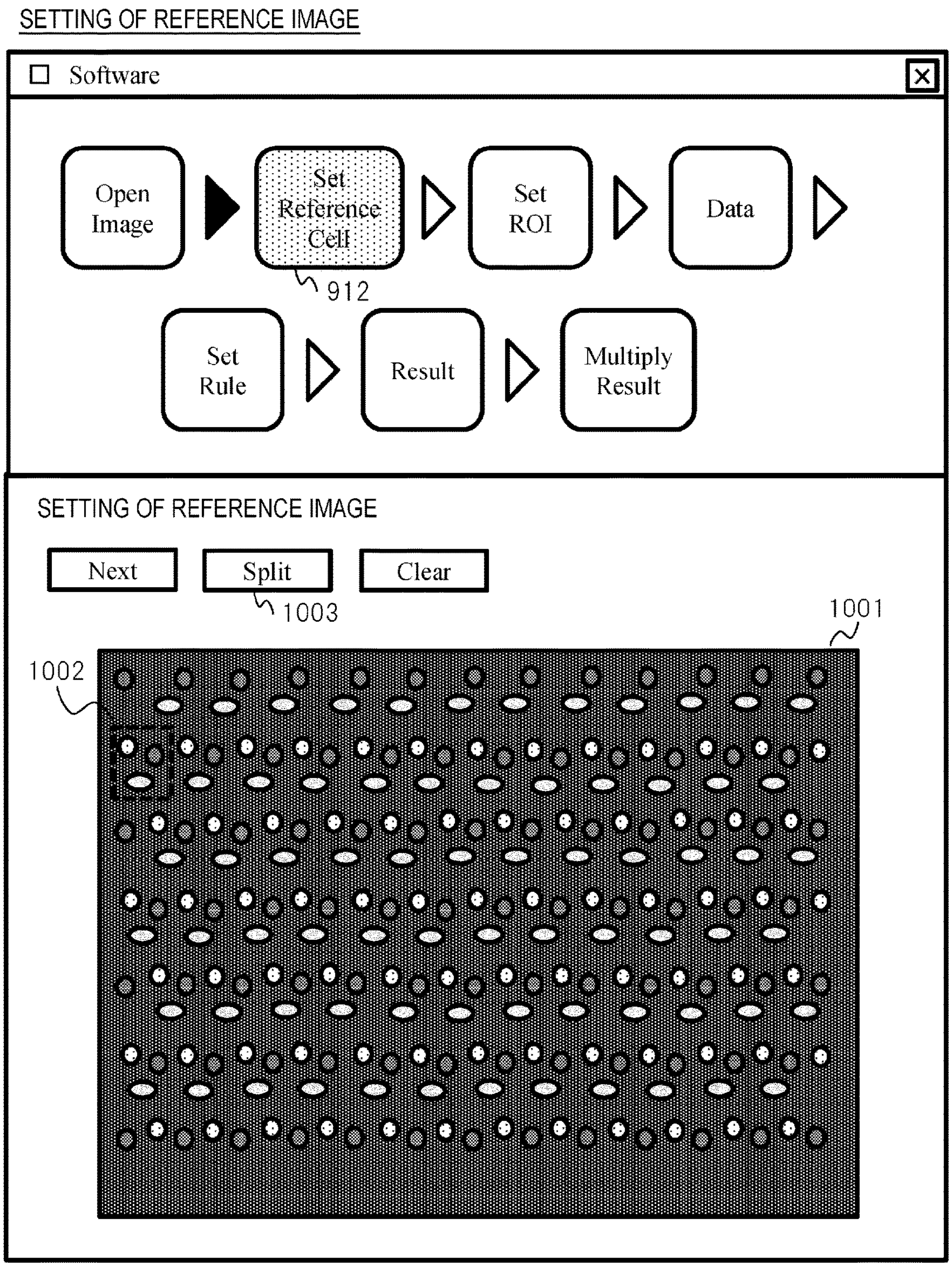

[FIG. 11]
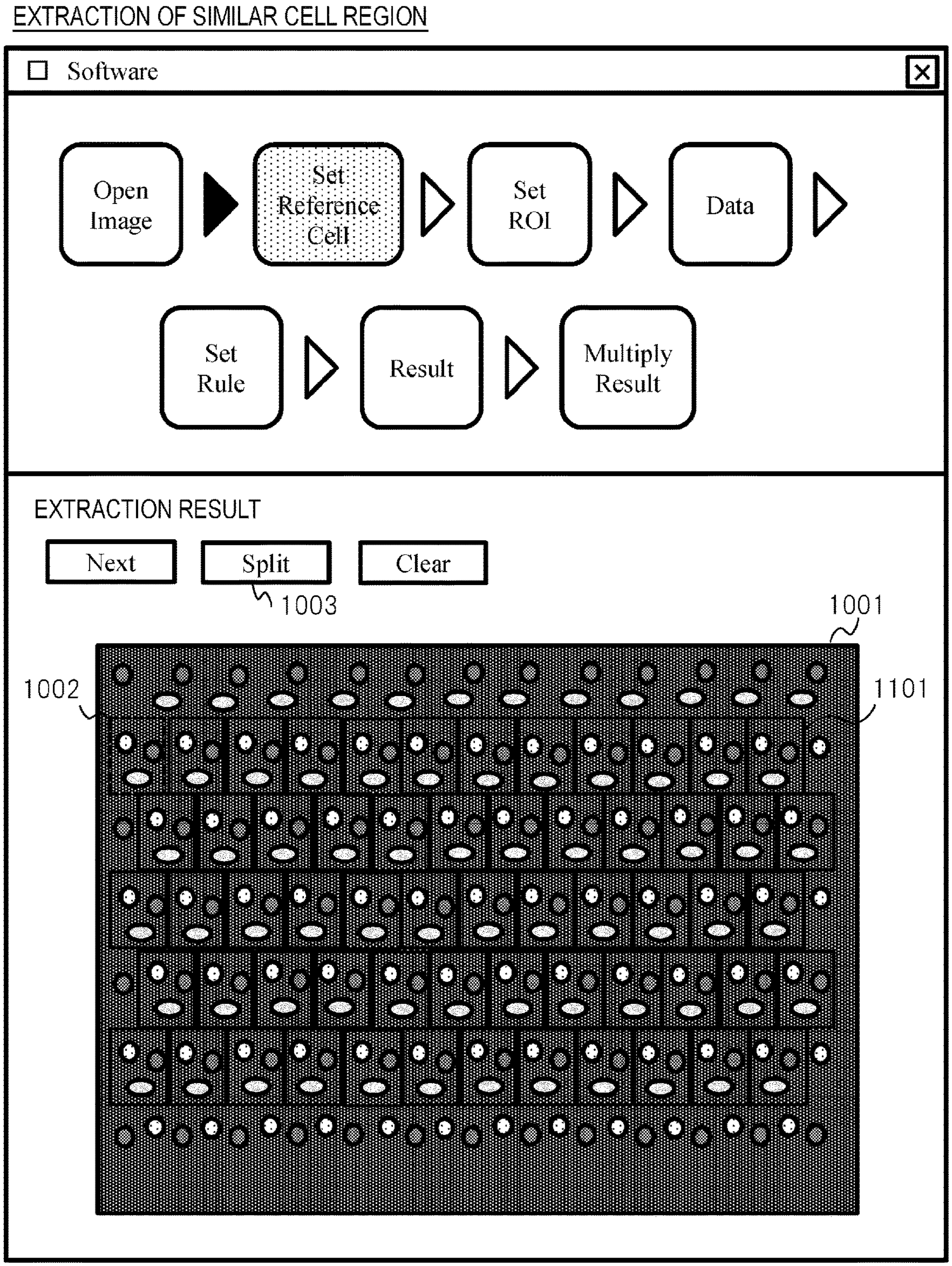

[FIG. 12]
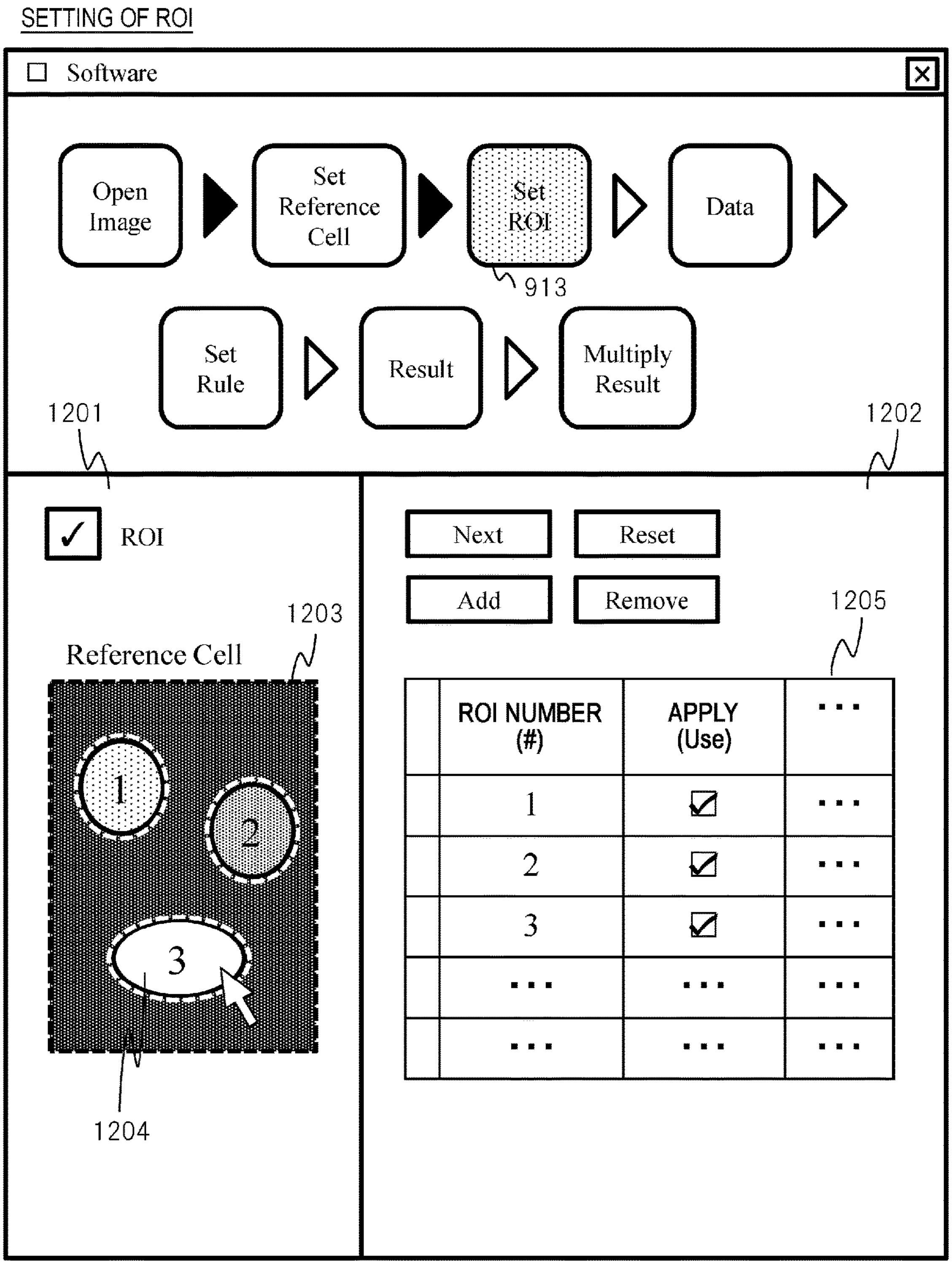

[FIG. 13]
DATA STORAGE
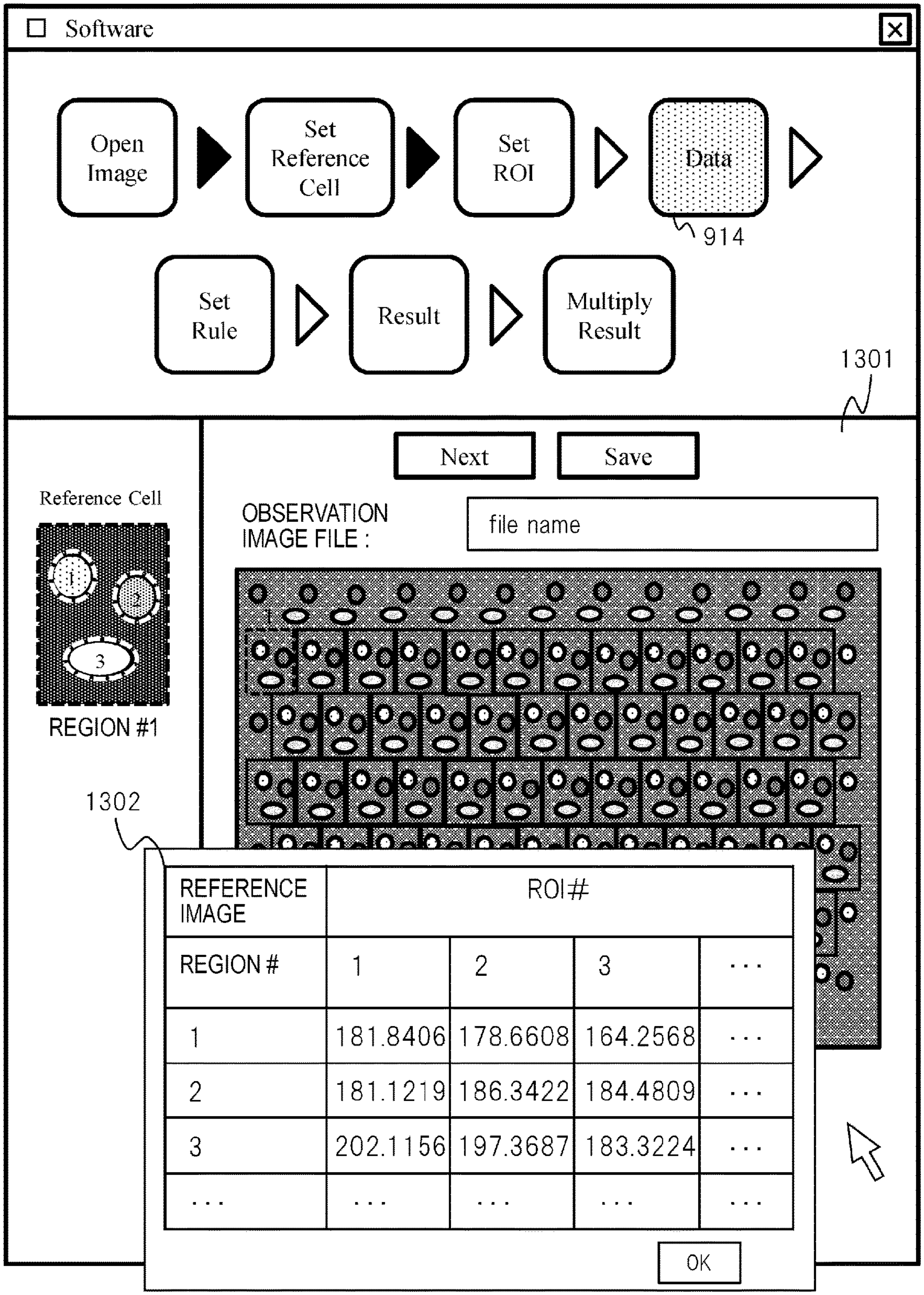

[FIG. 14]
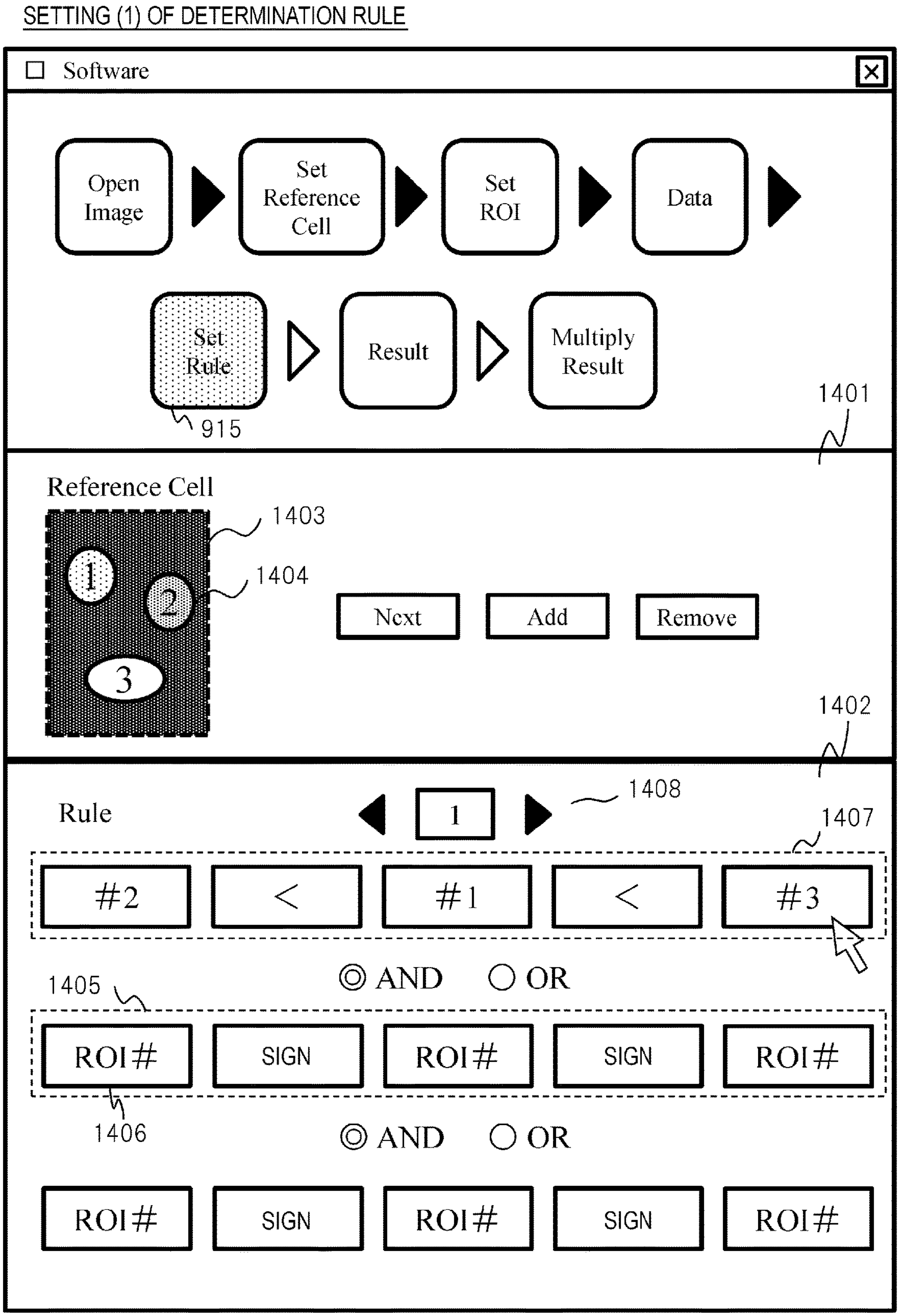

[FIG. 15]
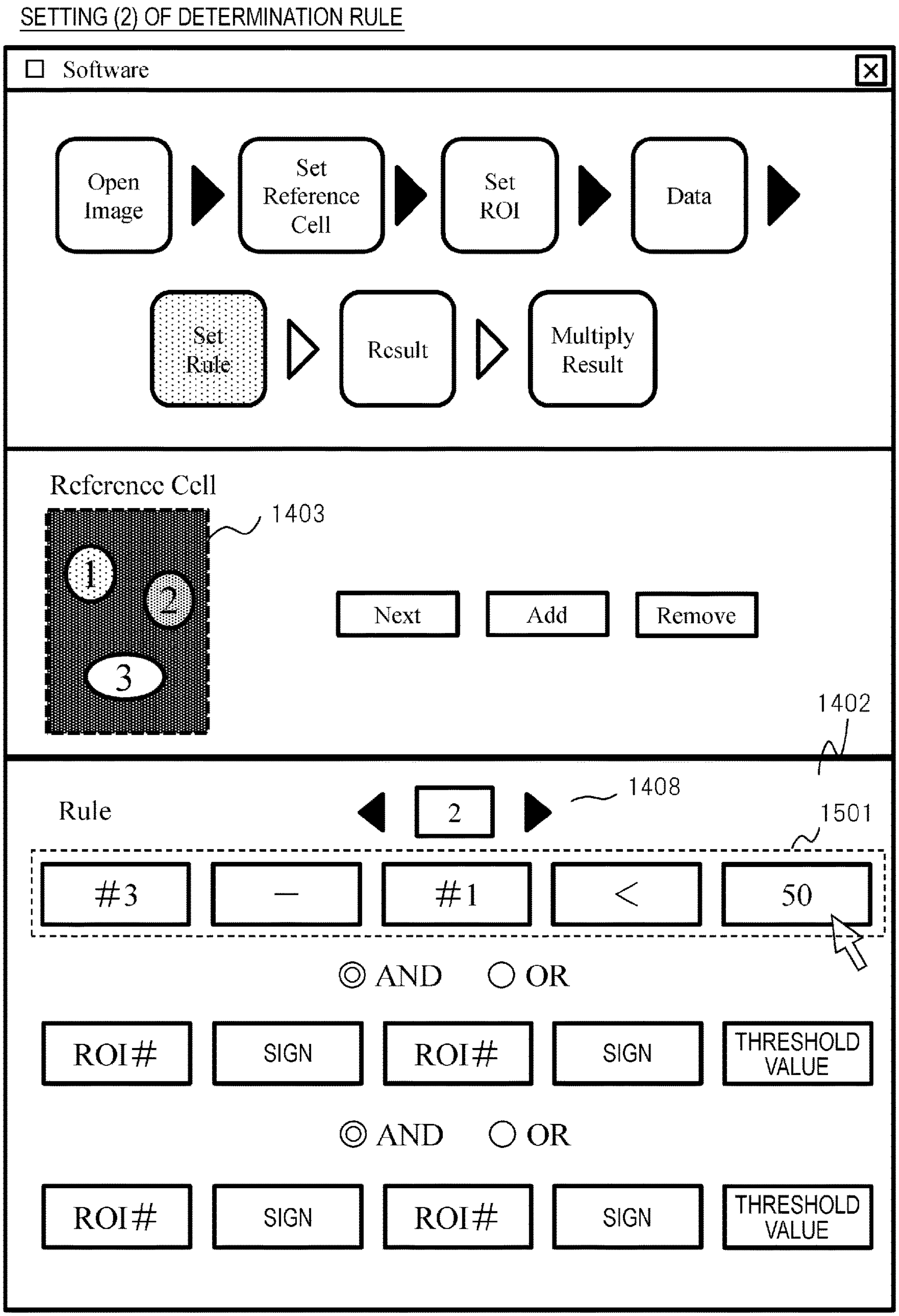

[FIG. 16]
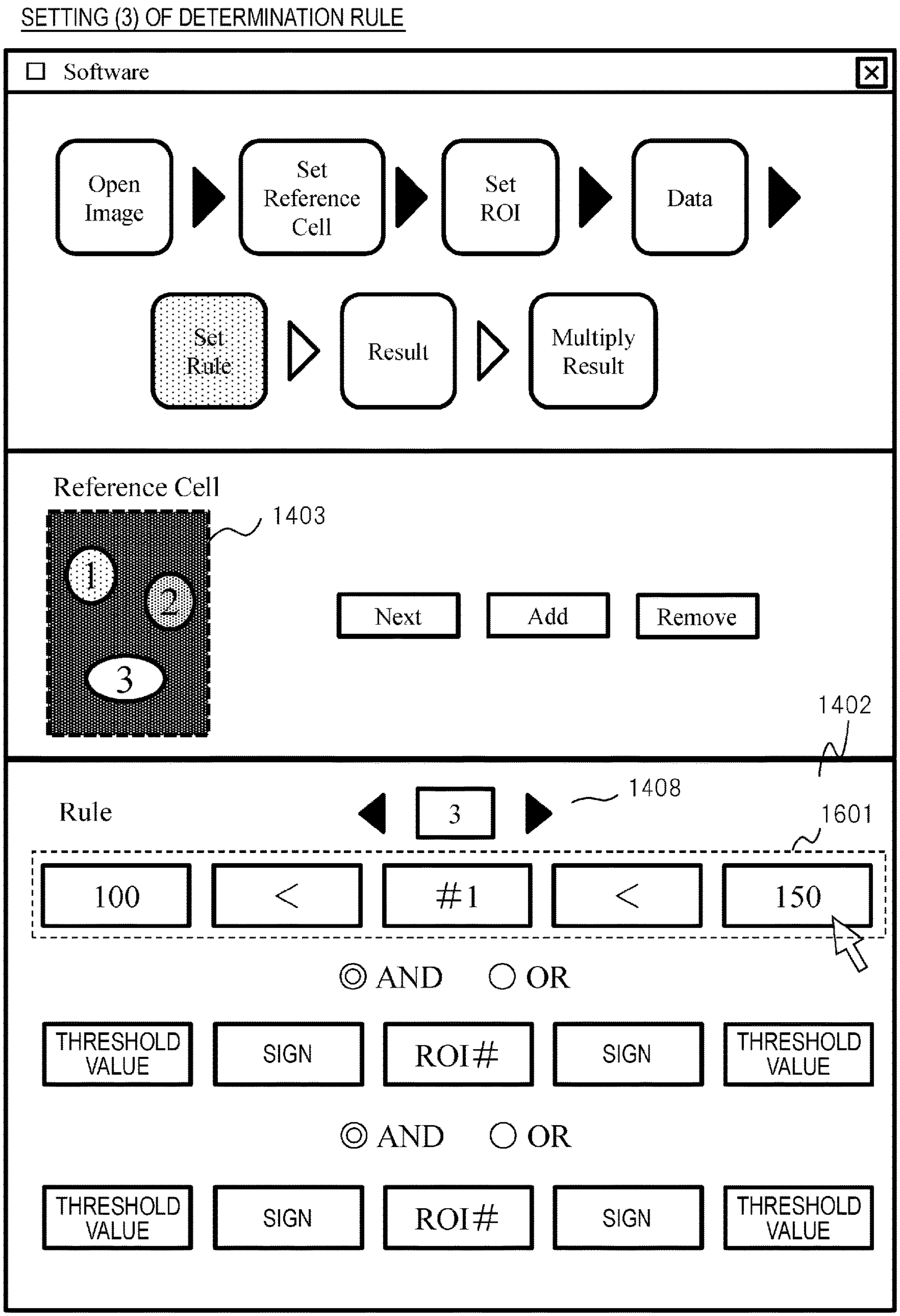

[FIG. 17]
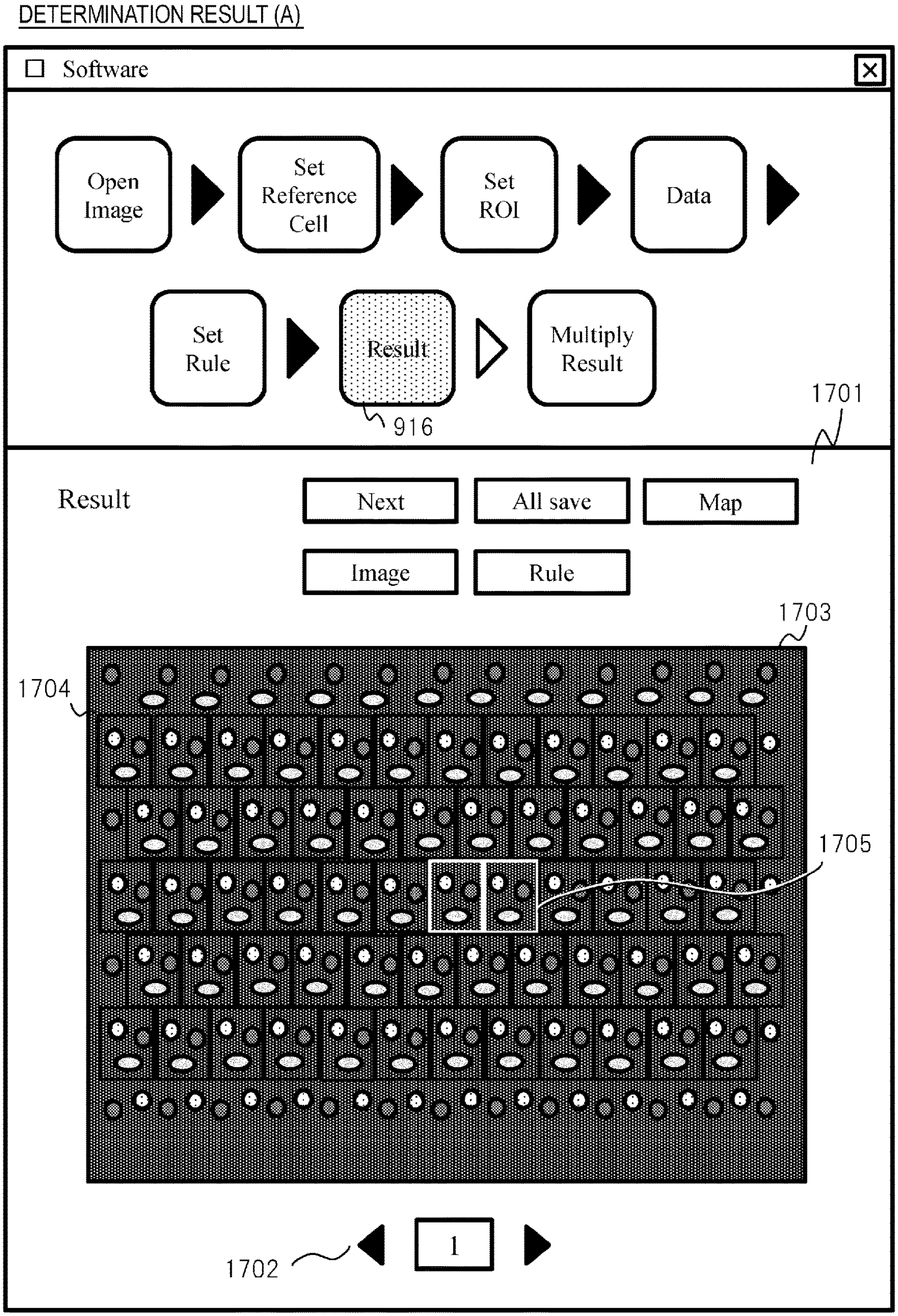

[FIG. 18]
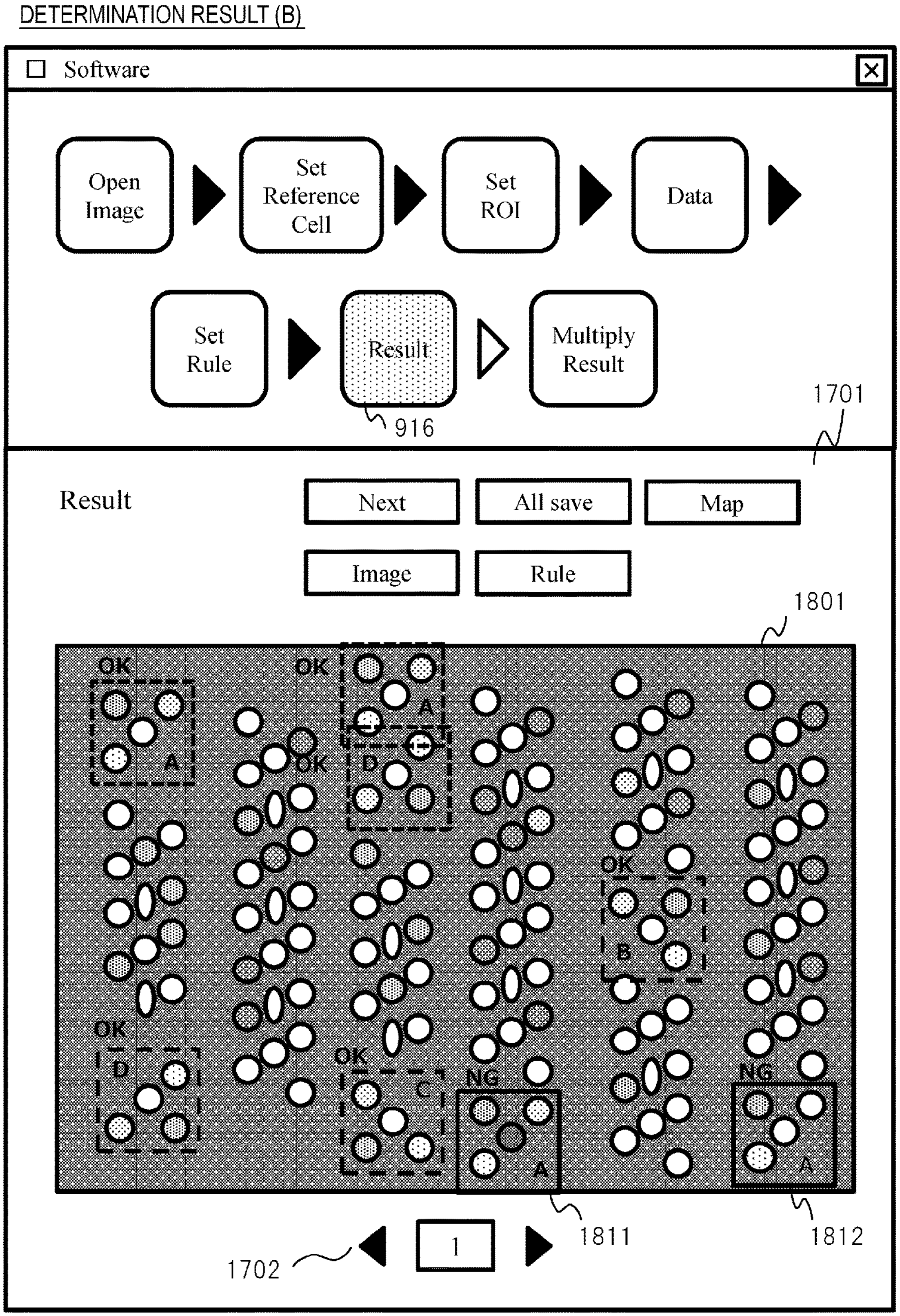

[FIG. 19]
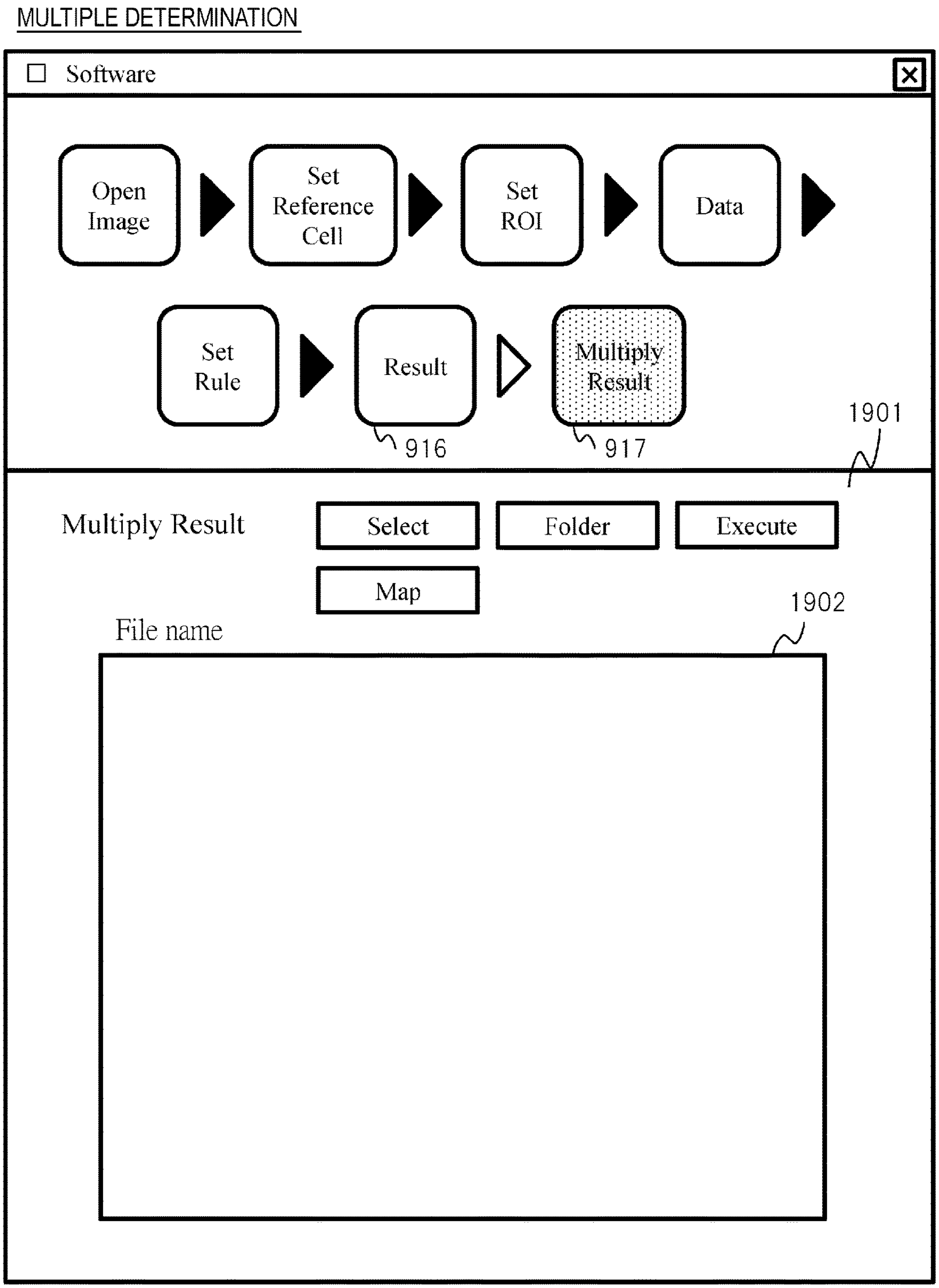

[FIG. 20]
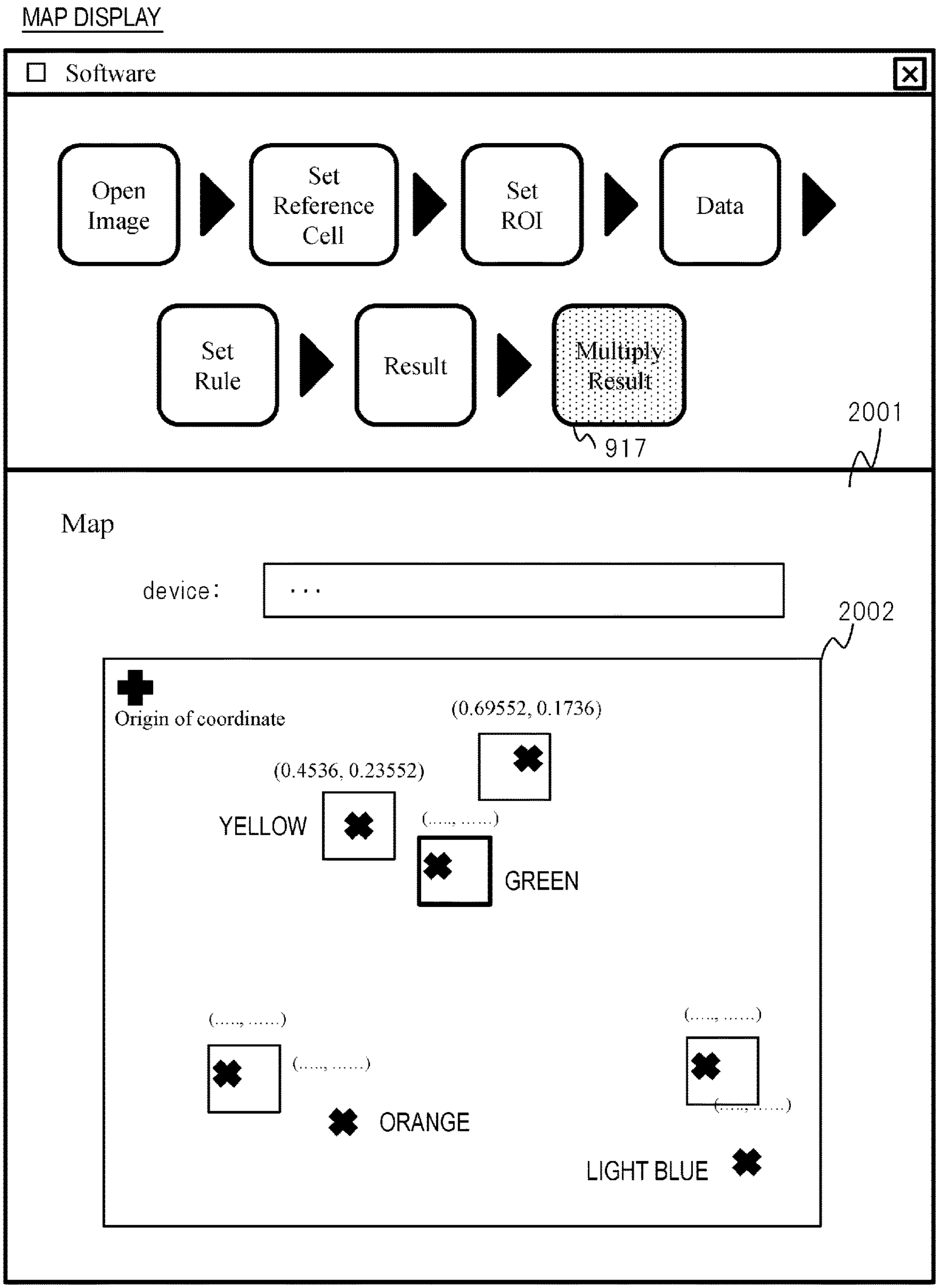

[FIG. 21]
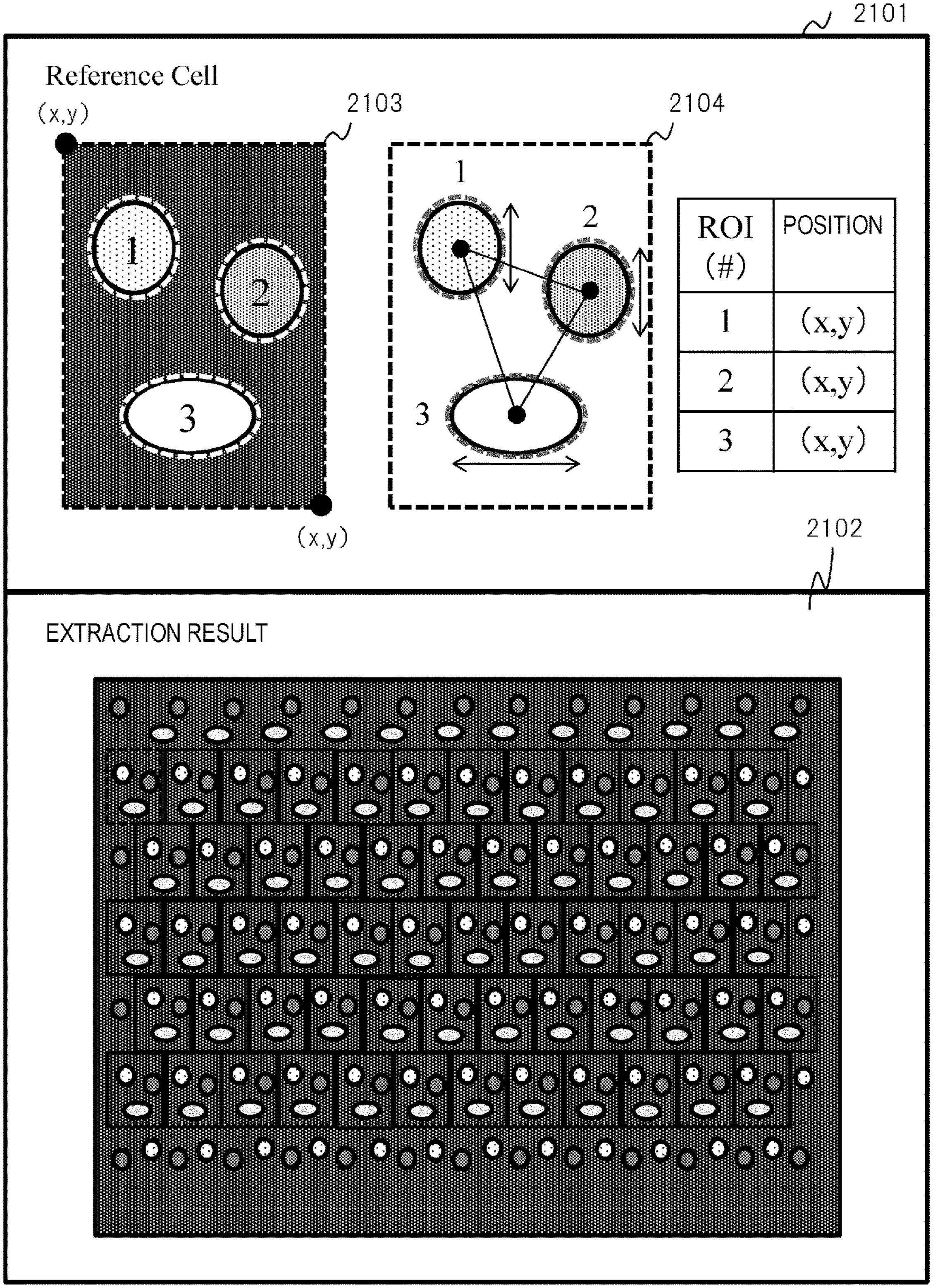
| ROI (#) | POSITION |
|---|---|
| 1 | (x,y) |
| 2 | (x,y) |
| 3 | (x,y) |

[FIG. 22]
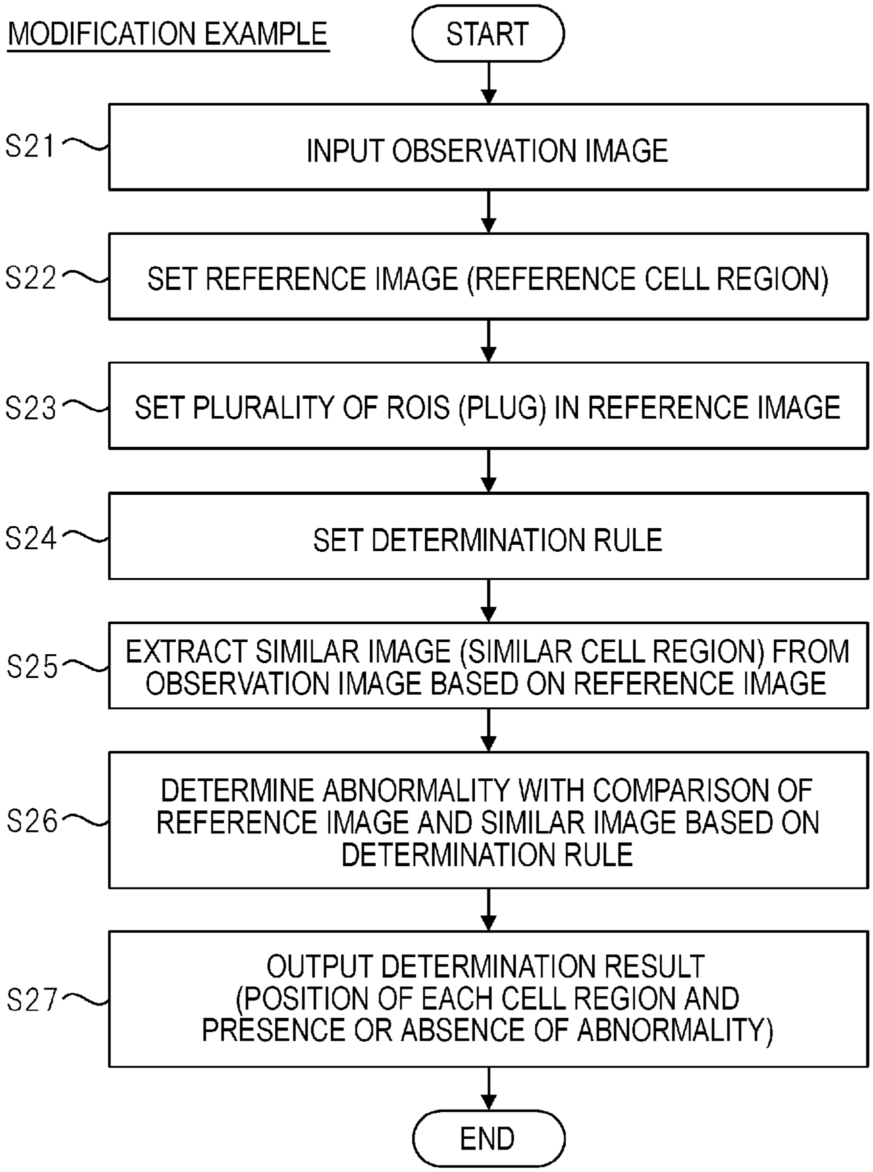

[FIG. 23]
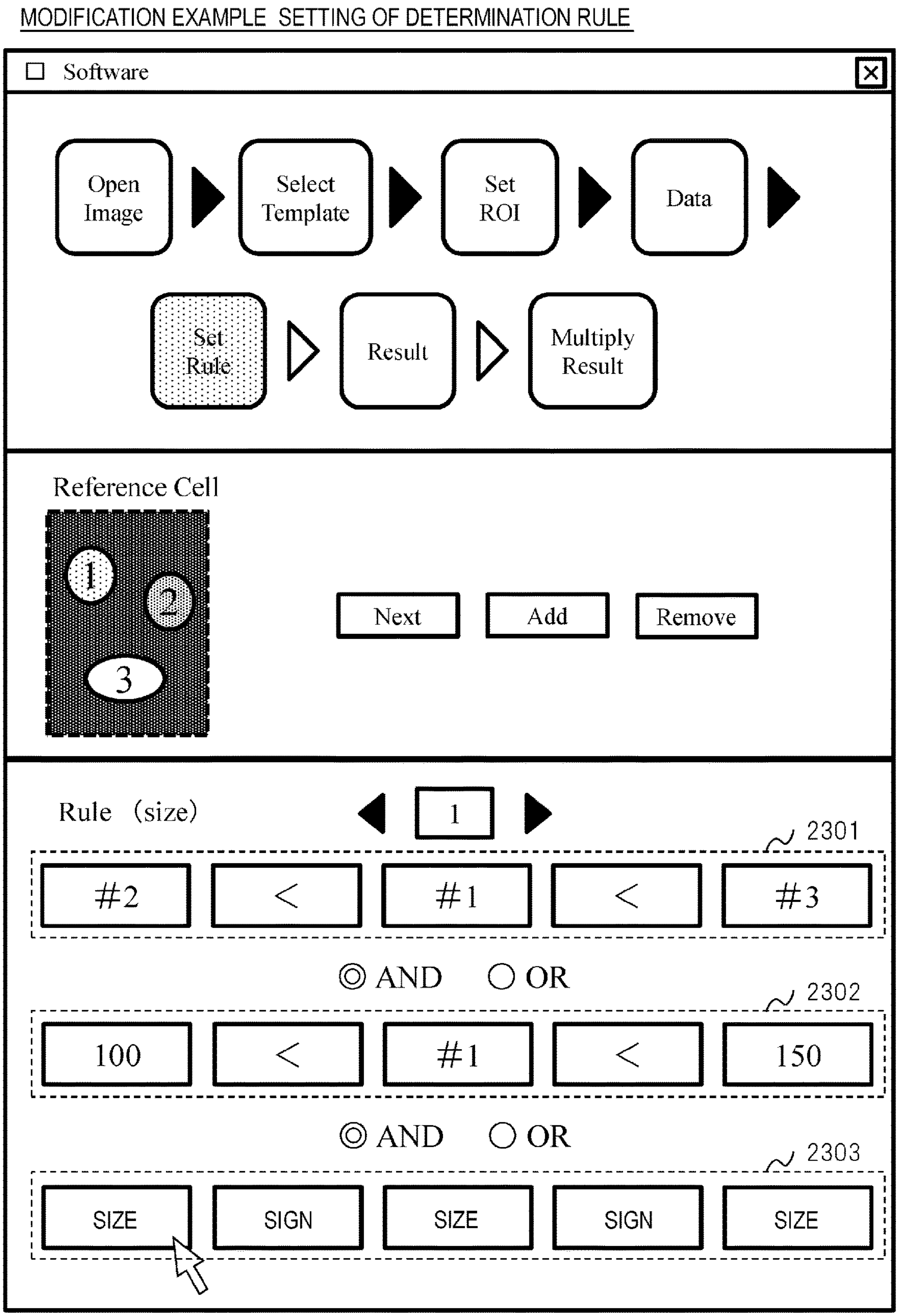

COMPUTER SYSTEM AND ANALYSIS METHOD

TECHNICAL FIELD

The present invention relates to a technique such as a charged particle beam apparatus, and in particular, to an analysis process of an observation image.

BACKGROUND ART

A charged particle beam apparatus such as a scanning electron microscope (SEM) can obtain an image such as a voltage contrast (VC) image as an observation image based on scanning of a sample with beam, light, or the like. A computer system connected to the charged particle beam apparatus executes an analysis process for detecting, for example, an abnormality or a defect (hereinafter, generically referred to as an abnormality) based on the observation image.

In defect analysis of a semiconductor device such as a logic device as a sample, for example, a VC observation method is used. In a VC observation image by an SEM, a difference in VC appears as brightness. The VC occurs with change in efficiency of emission of secondary electrons due to a potential difference generated on a charged surface of the sample. In the method, an abnormality is determined by analyzing brightness in the observation image.

An example of the related art is JP2010-25836A (PTL 1). PTL 1 describes that an external inspection apparatus capable of intuitively and quantitatively evaluating variation in a complicated structure of a semiconductor device is provided. PTL 1 describes that brightness and shape comparison is performed through comparison with a template image.

CITATION LIST

Patent Literature

PTL 1: JP2010-25836A

SUMMARY OF INVENTION

Technical Problem

In the related art, for defect analysis of a logic device or the like, the presence or absence of an abnormality is determined by comparing brightness between cell structures with human's visual observation on a VC observation image obtained by a charged particle beam apparatus such as an SEM. A plug region or the like that is an element configuring a device such as a transistor is included in the cell structure. Note that, in such a related art, for example, comparison of brightness values between plug regions having the same position relation is difficult in an observation image in which many identical or similar cell structures are arranged, and even though comparison is possible, a lot of effort and time is required. Furthermore, in such an observation image, a plurality of plug regions in a certain cell structure may be distributed as images in an inverted relation such as vertical inversion or horizontal inversion. In this case, while there is also a need to discriminate these images, discrimination is very difficult in visual observation and a lot of effort and time is required.

An object of the disclosure is to provide a technique capable of easily and efficiently implementing determination and detection of an abnormality by comparison between identical or similar cell structures in an observation image automatically to a certain extent or more without depending on visual observation, in relation to a technique of a computer system or the like that performs analysis or the like of an observation image obtained by a charged particle beam apparatus.

Solution to Problem

A representative embodiment of the disclosure has the following configuration. A computer system according to an embodiment is a computer system that analyzes an observation image of a sample by a charged particle beam apparatus, in which the observation image includes a plurality of cell regions, and there is a case where each cell region includes a plurality of regions that are elements configuring the cell region, and the computer system executes an extraction process of extracting one or more second cell regions similar to a reference image as a similar image from the observation image, the reference image being a first cell region designated by a user or automatically set, a determination process of comparing, based on a rule in which a relationship between a plurality of regions of interest included in the reference image is defined, the plurality of regions of interest between the reference image and the extracted similar image to determine presence or absence of an abnormality of a cell region of the similar image, and an output process of outputting, to the user, a position of each cell region and the presence or absence of the abnormality as a determination result.

Advantageous Effects of Invention

According to the representative embodiment of the disclosure, determination and detection of an abnormality by comparison between identical or similar cell structures in an observation image can be easily and efficiently implemented automatically to a certain extent or more without depending on visual observation, in relation to a technique of a computer system or the like that performs analysis or the like of an observation image obtained by a charged particle beam apparatus. Problems, configurations, effects, and the like other than those described above are shown in the embodiments for carrying out the invention.

BRIEF DESCRIPTION OF DRAWINGS

FIG. 1 shows a configuration example of a charged particle beam apparatus including a computer system of a first embodiment.

FIG. 2 shows a flow of a main process by the computer system of the first embodiment.

FIG. 3 shows an example of an observation image of a sample (sample A).

FIG. 4 shows an example of an observation image of a sample (sample B).

FIG. 5 shows an example of a reference image of the observation image of the sample (sample A).

FIG. 6 shows an example of a reference image of the observation image of the sample (sample B).

FIG. 7 shows an extraction process result example (for the sample A) in the first embodiment.

FIG. 8 shows an extraction process result example (for the sample B) in the first embodiment.

FIG. 9 shows a screen example of image input in the first embodiment.

FIG. 10 shows a screen example of reference image setting in the first embodiment.

FIG. 11 shows a screen example of similar image extraction in the first embodiment.

FIG. 12 shows a screen example of ROI setting in the first embodiment.

FIG. 13 shows a screen example of data storage in the first embodiment.

FIG. 14 shows a screen example of determination rule setting (first type) in the first embodiment.

FIG. 15 shows a screen example of determination rule setting (second type) in the first embodiment.

FIG. 16 shows a screen example of determination rule setting (third type) in the first embodiment.

FIG. 17 shows a screen example of a determination result (for the sample A) in the first embodiment.

FIG. 18 shows a screen example of a determination result (for the sample B) in the first embodiment.

FIG. 19 shows a screen example of multiple determination in the first embodiment.

FIG. 20 shows a screen example of map display in the first embodiment.

FIG. 21 shows an explanatory view of a method of automatically setting a reference cell region in the first embodiment.

FIG. 22 shows a processing flow in a modification example of the first embodiment.

FIG. 23 shows a setting example of a determination rule in the modification example of the first embodiment.

DESCRIPTION OF EMBODIMENTS

Hereinafter, embodiments of the disclosure will be described in detail with reference to the drawings. In the drawings, the same parts are denoted by the same reference numerals in principle, and repetitive description will be omitted. In the drawings, for ease of understanding of the invention, a representation of each component may not represent an actual position, a size, a shape, a range, and the like.

For description, in a case where a process by a program is described, description may be made with a program, a function, a processing unit, or the like as a subject. However, a subject as hardware regarding the program, the function, the processing unit, or the like is a processor or a controller, a device, a computer, a system, or the like configured with the processor and the like. The computer executes a process according to the program read onto a memory while appropriately using resources such as the memory and a communication interface by the processor. Accordingly, predetermined functions, processing units, and the like are implemented. The processor is configured with, for example, a semiconductor device such as a CPU or a GPU. The processor is configured with a device or a circuit capable of performing predetermined calculation. A process is not limited to a software program process, and can be implemented by a dedicated circuit. An FPGA, an ASIC, a CPLD, and the like can be applied as the dedicated circuit.

The program may be installed as data in a target computer in advance or may be distributed and installed as data into the target computer from a program source. The program source may be a program distribution server on a communication network or may be a non-transient computer-readable storage medium (for example, a memory card). The program may be configured with a plurality of modules. The computer system may be configured with a plurality of devices. The computer system may be configured with a client server system, a cloud computing system, or the like. Various kinds of data or information are represented or implemented in a structure such as a table or a list, but are not limited thereto. Representations of identification information, an identifier, an ID, a name, a number, and the like can be replaced with each other.

First Embodiment

A computer system of a first embodiment will be described with reference to FIGS. 1 to 21. The computer system of the first embodiment has a function (described as an analysis function) of acquiring and receiving an observation image that is a VC image obtained by imaging a semiconductor device as a sample (object to be observed) with a charged particle beam apparatus, and analyzing the observation image. In the analysis function (corresponding software), a reference image (in other words, a reference region) for comparison in the observation image is set by an operation input of a user or an automatic process. Software extracts a region (cell structure or the like) identical or similar to the reference image in the observation image as a similar image (in other words, a similar region). Software compares the reference region with the extracted similar region to determine an abnormality based on a set determination rule. The determination rule is a rule in which a plurality of plug regions included in a cell region are set as a plurality of regions of interest (ROIs) and a relationship (for example, a position relation, a size relation, a brightness relation, or the like) between the ROIs is defined. The user can set a reference cell region including a plurality of ROIs or the determination rule on a screen. Software outputs, to the user, a determination result (in other words, an abnormality detection result) including each cell region, the presence or absence of an abnormality, and the like as determination result.

[Charged Particle Beam Apparatus]

FIG. 1 shows a configuration of a charged particle beam apparatus 2 that is a system including a computer system 1 of the first embodiment. In the first embodiment, the charged particle beam apparatus 2 is an SEM, but is not limited thereto. A main body 3 of the charged particle beam apparatus 2 functions as an imaging apparatus that captures an observation image. The computer system 1 is connected to the main body 3 of the charged particle beam apparatus 2 via communication means such as a signal line. The computer system 1 corresponds to a controller that controls the charged particle beam apparatus 2. The computer system 1 may be a computer system externally connected to the main body 3 of the charged particle beam apparatus 2 or may be a computer system incorporated in the main body 3 of the charged particle beam apparatus 2. The computer system 1 may be configured with, for example, a PC or a server.

To the computer system 1, an input/output device including a display device 206 such as a liquid crystal display, an operation input device 207 such as a keyboard and a mouse, and the like is externally connected to the computer system 1 via an input/output interface 205. The input/output device may be incorporated in the computer system 1. The user is a person who operates and uses the computer system 1 such as an operator or a worker. The user operates the operation input device 207 to input an instruction or information while viewing a screen of the display device 206. The user operates the charged particle beam apparatus 2 through the computer system 1.

The main body 3 is a portion including a lens barrel (in other words, a housing) and the like configuring the SEM. In a configuration example of FIG. 1, the main body 3 includes an electron gun 101, a condenser lens 102, a deflection coil 103, an objective lens 104, a detector 105, a stage 106, a vacuum pump 107, a sample chamber 110, and the like. The stage 106 as a sample stage is provided in the sample chamber 110, and a sample 5 is placed and held on the stage 106. The stage 106 can be moved in at least a horizontal direction (X and Y directions) based on drive control from the controller, so that a visual field of imaging can be changed. The sample chamber 110 is brought into a vacuum state by the vacuum pump 107. The sample chamber 110 may be provided with a sensor that measures a state such as a degree of vacuum, a temperature, vibration, or electromagnetic wave.

Irradiation of a charged particle beam b1 generated in a vertical direction (Z direction) based on the electron gun 101 is controlled in the X and Y directions through actions of the condenser lens 102, the deflection coil 103, the objective lens 104, and the like. The condenser lens 102 and the objective lens 104 condense the charged particle beam b1. The deflection coil 103 deflects the charged particle beam b1 in the X and Y directions. Accordingly, the surface of the sample 5 is irradiated with the charged particle beam b1 while being scanned in the X and Y direction. With the irradiation of the charged particle beam b1, secondary electrons b2 and the like are generated from the surface of the sample 5. A potential difference occurs on the charged surface of the sample 5, and the efficiency of emission of the secondary electrons b2 is changed due to the potential difference. The potential difference appears as a difference in brightness in the observation image (VC image) of the SEM.

The secondary electrons b2 and the like generated from the surface of the sample 5 are detected by the detector 105. The detector 105 is, for example, a device in which imaging elements are arranged, and converts and detects the secondary electrons b2 and the like as an electrical signal. The detector 105 outputs the detected electrical signal as an image signal 150 through an amplification circuit, an analog/digital conversion circuit, and the like. The image signal 150 corresponds to an observation image. The image signal 150 is input to the computer system 1 through communication means such as a signal line and a communication interface 204 and is stored as data concerning an observation image in a storage device 203, for example. A processor 201 acquires and refers to data of the observation image to execute a process on the memory 202 and stores processing result data in the storage device 203.

The processor 201 of the computer system 1 performs drive control and the like on each unit of the main body 3 and acquires an observation image. The processor 201 reads a program stored in the storage device 203 onto the memory 202 and executes a program process based on the program, thereby implementing predetermined functions (analysis function and the like).

The computer system 1 includes the processor 201, the memory 202, the storage device 203, the communication interface 204, the input/output interface 205, and the like, and these units are connected to one another. Various programs, data, and information are stored in the storage device 203.

The processor 201 generates a screen to be a graphical user interface (GUI) concerning the analysis function and displays the screen on the display screen of the display device 206. The processor 201 receives an input from the user through the operation input device 207 and the GUI of the screen. The processor 201 may output sound to be a user interface through a speaker (not shown) or the like.

The processor 201 creates an observation image, which is a two-dimensional image, in the storage device 203 or the memory 202 based on the image signal 150 transferred from the main body 3. The observation image may be stored in association with information for management such as date and time, target sample information, position coordinate information of the sample surface corresponding to a visual field, imaging conditions, or a sensor value, or related information. The processor 201 displays the observation image within the screen having the GUI as described below. In the first embodiment, the observation image is an image that is used to detect a location of an abnormality on the surface by observation of the surface of the sample 5. The observation image may be called an inspection image or the like according to the purpose.

The present invention is not limited to the configuration of the computer system 1 of FIG. 1, and for example, a storage, a server, or the like may be externally connected by communication and necessary data and the like may be stored in the external device. The computer system 1 may be configured with a client server system or a cloud computing system. For example, the user accesses the server of the computer system 1 from a client PC and acquires data (for example, a Web page) of a screen and the like.

[Sample]

In the first embodiment, the sample 5 as an object for acquiring an observation image is a semiconductor device corresponding to a logic device as a product, for example. During or after manufacturing of a product, an observation image is acquired with the semiconductor device as the sample 5. The user who is a worker observes the observation image and checks the presence or absence of an abnormality on the surface of the semiconductor device using the analysis function by the computer system 1. According to the analysis function, the determination result such as the presence or absence of an abnormality is generated and output substantially automatically (in other words, semi-automatically) by minimizing manual work by the user. Therefore, the user may perform work of checking the determination result, and can significantly reduce effort or time of work by minimizing visual observation.

In the first embodiment, as will be described below (FIG. 3 or the like), a plurality of identical or similar structures (in other words, patterns) are arranged on the surface of the semiconductor device that is the sample 5, and in the analysis function and for description, each structure or pattern is described as a cell or a cell region. As a specific example, the cell corresponds to a device (circuit element) such as a transistor. A plurality of plugs (contact plugs) may be included in one cell region. The analysis function can set each plug as a region of interest (ROI) for an image process. As a specific example, the plug is an element configuring a device such as a transistor and is, for example, a region corresponding to a source, a drain, a gate, or the like. The plug region is formed by a laminated structure of a semiconductor, and a difference in brightness when viewed as an image appears due to a difference in material or the like.

[Processing Flow]

FIG. 2 shows a flow of a main process by the computer system 1 (in particular, the analysis function) of the first embodiment, and has Steps S1 to S7. In Step S1, the processor 201 of the computer system 1 receives and acquires the observation image from the main body 3. The processor 201 may acquire observation image data already stored in the storage device 203. The processor 201 executes the following analysis process on the observation image designated by the user.

In Step S2, the processor 201 sets a reference image (in other words, a reference cell region) in the observation image (also described as an entire image). The setting of the reference image can be performed on a setting screen (FIG. 10) described below. In the setting of the reference cell region, in a case where there is set reference image setting information, the set reference image may be selected, read, and applied.

In Step S3, the processor 201 extracts similar images (in other words, a similar cell region) from the observation image based on the reference image. The extraction process can be designated as one of commands in software and executed (FIG. 11 described below).

In Step S4, the processor 201 sets a plurality of regions of interest (ROIs) for a plurality of plugs in the reference image using the reference image and a plurality of extracted similar cell regions. The setting of the plurality of ROIs can be performed on a setting screen (FIG. 12 described below) described below. In the setting of the ROIs, in a case where there is set ROI setting information, the set ROIs may be selected, read, and applied.

In the first embodiment, specifically, the processor 201 calculates, for example, average brightness value or the like of each plug (the plug at the same arrangement position in the cell) as a statistical process using the plurality of similar cell regions extracted in the extraction process and sets the average brightness value to each ROI of the plurality of ROIs of the reference cell region. In the setting of the ROIs or the like, the processor 201 extracts a region where brightness is higher than brightness of a darkest background region by a predetermined brightness threshold value or more on the device surface, as a plug region. The range of the brightness value is, for example, 0 (black) to 255 (white).

In Step S5, the processor 201 sets a determination rule (also simply referred to as a rule) based on an operation or check of the user on a setting screen (FIG. 14 or the like) described below. The determination rule is a rule that is applied in the determination process. One or more determination rules are set and one or more determination rules can be applied. For the determination rule to be applied, in a case where there is already set determination rule setting information, the determination rule may be selected and referred to.

In Step S6, the processor 201 determines an abnormality of a cell region (in particular, a plug that is an ROI) by comparison between the reference image (reference cell region) and the similar image (similar cell region) based on the determination rule to be applied. The abnormality determination includes determination of the presence or absence of an abnormality and a location or position of an abnormality. In the first embodiment, while two-value determination of the presence or absence of an abnormality is simply performed, the invention is not limited thereto, and multi-value determination of a degree or a possibility of abnormality, defect, or the like may be performed. For example, the degree of abnormality may be divided into a plurality of levels using a plurality of threshold values.

In Step S7, the processor 201 displays information of the determination result on the screen having the GUI, or the like to output information to the user. Various kinds of data and information created in the processes of the analysis function as described above are stored in the storage device 203.

The processing flow of the above-described first embodiment is a flow in which the extraction process of Step S3 is executed before Step S4 such that the computer system 1 automatically generates and presents a suitable reference cell region as a plurality of ROIs of a reference cell region (in other words, a reference cell region including a plurality of ROIs). The suitable reference cell region generated using the extracted similar cell is presented, and the user can check the suitable reference cell region and confirm the suitable reference cell region as a reference cell region.

[Observation Image]

FIG. 3 shows an example of an observation image 301 of a certain sample 5 (referred to as a sample A) in the first embodiment. The sample A has identical or similar cell structures arranged on a surface (X-Y plane). A cell is made of an arrangement of one or more plugs. The X direction (X axis) is referred to as a horizontal direction in the image, and the Y direction (Y axis) is referred to as a vertical direction in the image. The observation image 301 is a rectangular image having a predetermined size (the number of pixels in the X direction, the number of pixels in the Y direction). Each pixel has position coordinate information on the surface of the sample 5. A cell 302 is an example of a certain cell region. The cell 302 includes, for example, three plugs 311 (plug regions) disposed in a predetermined position relation, the three plugs 311 have a predetermined brightness region, and in the example, the plugs 311 are different in brightness. In the observation image 301, the cell 302 (a plurality of corresponding plugs) and identical or similar cells (a plurality of corresponding plugs) are arranged. A cell 303 or a cell 304 is a cell having a structure different from the cell 302 and includes two plugs. A background region of the observation image 301 has a color close to black having lowest brightness, and each plug has brightness higher than the background region. The user can set a desired cell, for example, the cell 302 as a reference image (reference cell region). Then, a plurality of plugs in the cell 302 can be set as ROIs described below.

FIG. 4 shows an example of an observation image 401 of another sample 5 (referred to as a sample B) in the first embodiment. Like the sample A, the sample B is an example of a sample in which identical or similar cell structures are arranged on a surface (X-Y plane), and various inverted dispositions (patterns) in relation to a certain cell structure are included. The cell 402 is an example of a certain cell region. The cell 402 includes, for example, four plugs 411 (plug regions) disposed in a predetermined position relation, the four plugs 411 have a predetermined brightness relation, and in the example, the plugs 411 are different in brightness. In the observation image 401, the cell 402 (a plurality of corresponding plugs) and identical or similar cells (a plurality of corresponding plugs) are arranged. A cell 403 or a cell 404 is an example of a cell having a structure different from the cell 402, and the number of plugs, positions, shapes, brightness, and the like of the plugs are different.

A cell 405 is a cell having a disposition of a plurality of plugs identical to the cell 402, a cell 406 is an example of a cell having a disposition of a plurality of plugs horizontally inverted with respect to the cell 402, a cell 407 is an example of a cell having a disposition of a plurality of plugs vertically inverted with respect to the cell 402, and the cell 408 is an example of a cell having a disposition of a plurality of plugs diagonally inverted with respect to the cell 402. The user can set a desired cell, for example, the cell 402 as a reference image. Then, a plurality of plugs in the cell 402 can be set as ROIs. A plug 421 or a plug 422 shows an example where brightness deviates from brightness of another plug, and such a plug (a cell including the plug) is determined as an abnormality in abnormality determination described below.

Data of the observation image is not only data of the brightness value of each pixel but also data having position coordinate information obtained by the SEM. For example, the observation image has position coordination information for each pixel. For example, the observation image has position coordination information of an upper left point and a lower right point of the observation image. The observation image has the position coordination information, so that map display described below can be performed.

[Reference Image (Reference Cell Region)]

FIG. 5 shows a setting example of a reference cell region (reference image) and a plurality of regions of interest (ROIs) corresponding to the example of the observation image 301 of the sample A of FIG. 3. Such a reference image 501 is set as a reference for searching for and extracting a similar cell region and a reference for abnormality determination. The reference image (reference cell region) 501 set corresponding to the cell 302 of FIG. 3 includes three plug regions of a plug 511, a plug 512, and a plug 513. The plug region has, for example, an elliptical shape. Here, for ease of understanding, each plug region is shown with a plug number (#). The three plug regions are disposed in a predetermined position relation as shown in the drawing. For example, the plug 511 is disposed on an upper left side, the plug 512 is disposed on an upper right side, and the plug 513 is disposed on a lower side, with respect to the center of gravity or the center of the cell region. The reference cell region 501 is displayed in a predetermined representation (for example, a yellow broken line frame) on a screen described below.

There is a case where each plug region has brightness, and brightness is different between the plug regions. The three plugs of the example have a brightness relation in which brightness is turned from high (white) to low (black) in an order of the plug 513 of ROI number (#)=3, the plug 511 of #=1, and the plug 512 of #=2. In a lower portion of the FIG. 5, a brightness relation of the three plugs of the reference cell region 501 is shown. In the drawing, the plug regions and brightness are schematically shown by dot patterns. The background region has a predetermined darkest brightness value, but it is assumed that the background region is shown white and excluded. The plug 513 of the ROI number (#)=3 has a first brightness value, the plug 511 of #=1 has a second brightness value, the plug 512 of #=2 has a third brightness value, and brightness is higher in a direction from the third brightness value to the first brightness value. In a case where there is a brightness distribution in one plug region, an average brightness value or the like in one plug region may be calculated and the average brightness value or the like may be set as the brightness value of the plug. There is a case where brightness is different between an edge and a center portion of a plug, and in this case, only brightness of the edge portion can be set as an average brightness value. The user can select whether to employ the average brightness value of the entire plug or to employ the average brightness value of the edge portion of the plug in rule setting.

FIG. 6 shows a setting example of a reference cell region (reference image) and a plurality of ROIs corresponding to the example of the observation image 401 of the sample B of FIG. 4. Such a reference image 601 is set as a reference for searching for and extracting a similar cell region and a reference for abnormality determination. A reference image (reference cell region) 601 set corresponding to the cell 402 of FIG. 4 includes four plug regions indicated by ROI numbers (#)=1 to 4. The four plug regions are disposed in a predetermined position relation as shown in the drawing. For example, the plug of #=1 is disposed near the center of gravity or the center, the plug of #=2 is disposed on a lower left side, the plug of #=3 is disposed on an upper right side, and the plug of #=4 is disposed on an upper left side, with respect to the center of gravity or the center of the cell region.

In a lower portion of FIG. 6, a brightness relation of the four plugs of the reference cell region 601 is shown. The plug of the ROI number (#)=1 has a first brightness value, the plug of #=2 has a second brightness value, the plug of #=3 has a third brightness value, the plug of #=4 has a fourth brightness value, and brightness is higher in a direction from the fourth brightness value to the first brightness value.

As in FIG. 4 described above, a cell region of a disposition pattern inverted horizontally, vertically, diagonally, or the like with respect to a certain cell region is provided. For example, the reference cell region 601 is referred to as a pattern A having the same disposition (no inversion). A cell region 602 having a disposition horizontally inverted on the Y axis with respect to the cell (reference cell region 601) of the pattern A is referred to as a pattern B. A cell region 603 having a disposition vertically inverted on the X axis with respect to the cell of the pattern A is referred to as a pattern C. A cell region 604 having a disposition diagonally inverted, in other words, horizontally inverted and vertically inverted with respect to the cell of the pattern A is referred to as a pattern D. The cell regions of various types of disposition patterns are included in the observation image 401 of FIG. 4. There is a case where only some patterns are included depending on the sample or the region.

The cell regions of various disposition patterns including the reference cell region 601 are displayed distinguishingly in a predetermined representation according to the disposition pattern on a screen (FIG. 18) described below. For example, the reference cell region 601 of the pattern A is displayed by a yellow broken line frame, the cell region 602 of the pattern B is displayed by an orange solid line frame, the cell region 603 of the pattern C is displayed by a green solid line frame, and the cell region 604 of the pattern D is displayed by a light blue solid line frame. The representation may be distinguished according to whether a certain cell region is a reference image or the like (similar image), or the representation may be distinguished according to whether a certain cell region has an abnormality or no abnormality. A region such as the reference cell region is normally set as a rectangular region for an efficient image process.

[Extraction Process]

FIG. 7 shows an example of a similar cell region extracted by the extraction process (Step S3 of FIG. 2) of the similar image corresponding to a case of the observation image 301 of the sample A of FIG. 3. In a case where one cell region near upper left is set as a reference image 701, similar cell regions 702 similar to the reference image 701 are extracted from the observation image 301. Each similar cell region 702 is displayed in a state of being surrounded by a rectangular solid line frame. Furthermore, in a case where the reference image is set in advance, the region displayed as the reference image 701 in FIG. 7 is also extracted as the similar image 702. Here, the background region is shown white.

FIG. 8 shows an example of similar cell regions extracted by the extraction process (Step S3 of FIG. 2) of the similar image corresponding to a case of the observation image 401 of the sample B of FIG. 4. In a case where one cell region near upper left is set as a reference image 801, similar cell regions (811, 812, 813, 814) similar to the reference image 801 are extracted from the observation image 401. Each similar cell region is displayed in a state of being surrounded by a rectangular solid line frame. Here, the background region is shown in white. Furthermore, cell regions of various disposition patterns as shown in FIG. 6 are extracted, and are distinguished and displayed, for example, by changing color for each pattern, attaching a character or a mark for identifying a pattern, or the like. For example, the similar cell region 811 is a cell of a pattern A with the same disposition and no inversion. The similar cell region 812 is a cell of a pattern B with horizontal inversion. The similar cell region 813 is a cell of a pattern C with vertical inversion. The similar cell region 814 is a cell of a pattern D with diagonal inversion. The plug 421 or the plug 422 is an example of a plug with an abnormality. The plug 421 is made to be lower in brightness than the brightness of the plug at the center in the reference cell region 801. The plug 422 is made to be higher in brightness than the brightness of the plug in the upper right of the reference cell region 801.

[Gui Screen]

Next, a screen example having a GUI concerning the analysis function of the computer system 1 will be described. Each screen may be provided as a Web page, for example.

[Image Input (Step S1)]

FIG. 9 shows a screen example of image input (in FIG. 3, Step S1). On the screen of FIG. 9, a button corresponding to each step of the flow concerning work is provided in an upper field 901, and a progress state of the step of the flow is represented according to a display state of the button or the like. In the example, as the buttons of the flow, an image input ("Open Image") button 911, a reference cell setting ("Set Reference Cell") button 912, a region-of-interest setting ("Set ROI") button 913, a data ("Data") button 914, a determination rule setting ("Set rule") button 915, a determination result ("Result") button 916, a multiple determination ("Multiply Result") button 917 are provided. The buttons are connected by arrows.

First, in a case where the image input button 911 is pressed by an operation of the user, the image input button 911 is displayed distinguishingly, and a GUI for image input for selecting and opening an observation image file is displayed in a lower field 902. In the GUI, the user selects an observation image file as an analysis target and presses an open (Open) button. Then, transition is made to a screen of a next step.

[Reference Image Setting (Step S2)]

FIG. 10 shows a screen example of reference image setting (Step S2 in FIG. 2). In a case where the reference image setting button 912 is pressed, a GUI for setting the reference image (reference cell region) is displayed in the lower field. In the field, a target observation image 1001 is displayed. The observation image 1001 of the example corresponds to the observation image 301 of the sample A of FIG. 3. The user views and checks the observation image 1001, and sets a desired cell structure as a reference image 1002 by an operation. For example, the user sets a desired region as the reference image 1002 by surrounding the desired region with a rectangle or designating a start point and an end point of a rectangle from the observation image 1001 by an operation of the mouse or the like. The user presses a next (Next) button in a case of proceeding to a next step, and restarts by pressing a clear (Clear) button in a case of restarting setting. Furthermore, the user presses an extraction (Split) button 1003 in a case of proceeding to the extraction process. In a case where a reference image is prepared in advance, the image is called from the memory 202 and can be set as a reference image to be applied.

[Extraction (Step S3) of Similar Cell Region]

FIG. 11 shows a screen example of the extraction process (Step S3 in FIG. 2) of the similar cell region (similar image). In a case where the extraction button 1003 is depressed, an extraction result (corresponding to FIG. 7) of similar images on the observation image 1001 is displayed in a lower field. For example, each similar cell region 1101 for the reference cell region 1002 is displayed by a rectangular solid line frame.

[Setting (Step S4) of Region of Interest]

FIG. 12 shows a screen example of setting (Step S4 in FIG. 2) of a region of interest (ROI). In a case where the region-of-interest setting button 913 is pressed, GUIs for setting a plurality of ROIs (plugs) in the reference cell region are displayed in lower fields 1201 and 1202. In the left field 1201, a reference cell region 1203 and ROIs 1204 therein during setting work are displayed. In the right field 1202, information regarding a plurality of extracted ROIs in the reference cell region is arranged and displayed in a table format, for example. A table 1205 has, for example, items such as an ROI number and "APPLY", and may have other items such as a brightness value.

In the first embodiment, the processor 201 automatically generates a suitable reference cell region (including setting of brightness values of a plurality of ROIs) using the plurality of similar cell regions extracted by the extraction process of Step S3 of FIG. 2 and displays the generated reference cell region in the field 1201. The user checks the generated reference cell region 1203 and the ROIs 1204 in the field 1201, and in a case where contents are satisfactory, formally sets the reference cell region 1203 and the ROIs 1204. That is, the user proceeds to a next step with a next (Next) button in the field 1202, so that the reference cell region 1203 and the ROIs 1204 in the field 1201 are set as setting information.

In the example, first, the extracted three plugs (#=1 to 3) are displayed in the reference cell region 1203. The user can switch apply/non-apply as an ROI by clicking and surrounding a desired plug region in the left field 1201 to select the plug region. Also in the right field 1202, the user can switch apply/non-apply as an ROI by operating a checkmark in an "Apply (Use)" item of a row of a desired ROI number (#). In the example, three plug regions of #=1 to 3 are displayed in a state of being surrounded by circular or elliptical broken line frames (for example, displayed in red), and all plug regions are set as being applied as an ROI. In addition, the user can add another plug as an ROI to the reference cell region 1203 by an "add (Add) button" and a manual operation, and can remove an unnecessary plug partial image from the reference cell region 1203 by a remove (Remove) button (for example, filled with the same brightness as the background region). In a case where the user manually sets an ROI, for example, the user may designate an elliptical frame in desired shape and size by a mouse operation or the like in the field 1201 and may set the elliptical frame as an ROI.

[Data Check and Storage]

FIG. 13 shows a screen example of data check and storage. In a case where the data button 914 is pressed, various kinds of data (including setting information) created so far (Steps S1 to S4) are displayed on the screen. The user checks data on the screen, and in a case where contents are satisfactory, can store data by pressing a save (Save) button. The setting information or information regarding brightness can be stored inside the processor 201 and displayed as necessary. The processor 201 stores data and information in the storage device 203 in association with each other. The setting information is setting information of the reference cell region and a plurality of ROIs therein. The user can store each piece of data with a name. On the screen, a file name and the like of each piece of data may be displayed as a list.

The screen example of FIG. 13 is an example where setting information regarding a reference image (reference cell region) and a plurality of ROIs in a certain observation image is checked and stored as a data example. In a field 1301, the set reference cell region and the extracted similar cell regions are displayed on the observation image. A region number may be displayed for each region. In Table 1302, for each reference image (reference cell region) identified by a region number (#), a brightness value of each ROI of a plurality of ROIs configuring the reference image is displayed. A file (a format is, for example, csv) of the setting information like the table 1302 can be stored by pressing a save (Save) button. The invention is not limited thereto, and as other kinds of data, relative position coordinate information of each ROI of the reference image or information such as the diameter of the size of each ROI can be checked and stored similarly. Furthermore, Table 1302 may be referred to as data in which a position relation between the regions of interest is defined regarding a disposition pattern of a plurality of regions of interest of the reference image (reference cell region).

[Setting (Step S5) of Determination Rule]

FIG. 14 shows a screen example of setting (Step S5 in FIG. 2) of a determination rule. In a case where the determination rule setting button 915 is pressed, GUIs for setting a determination rule are displayed in lower fields 1401 and 1402. In the field 1401, a set reference cell region 1403 and a plurality of ROIs 1404 associated with a determination rule are displayed. In the field 1402, first, a template (conditional expression template) 1405 for setting a rule is displayed. The template 1405 is configured with, for example, five items (buttons) 1406. As the items (buttons) 1406, an ROI number (#) item or a sign item is provided. The five items 1406 of the template 1405 are, for example, ROI number, sign, ROI number, sign, and ROI number arranged in order from left. The user can select and set the ROI number or the sign in a desired item 1406. The ROI number (#) item can be changed to a brightness value item (in other words, a threshold value item) by an operation of the user. The ROI number (#) item is an item for setting the ROI number, the brightness value item is an item for setting a brightness value, and the sign item is an item for setting a sing (an inequality sign, a minus sign, or the like; for example, <, >, ≤, ≥, −).

The user can configure a conditional expression by operating the items 1406 of the template 1405. For example, in an upper row, #2<#1<#3 is set as a conditional expression 1407. The conditional expression defines a magnitude relation of the brightness value between the ROIs of the respective ROI numbers in the reference cell region 1403. Specifically, the conditional expression 1407 defines that the ROI with the ROI number (#) of 1 has the brightness value greater than the ROI with #=2 and has the brightness value smaller than the ROI with #=3. The conditional expression corresponds to the determination rule. Similarly, a conditional expression can be set in each row, and in addition, AND/OR logic is set between rows, so that a conditional expression obtained by combining a plurality of conditional expressions with the AND/OR logic can be configured as a determination rule.

One determination rule can be set on one page of the field 1402. The page can be switched by an operation of a page button 1408. On another page, similarly, a different determination rule can be set. Furthermore, a determination rule can be added by an add (Add) button. A determination rule can be removed by a remove (Remove) button. The user can proceed to a next step by a next (Next) button.

The determination rule of the conditional expression 1407 in FIG. 14 is an example of a first type determination rule. The first type determination rule is a rule in which a relation of brightness between ROIs is defined. The determination rule determines the presence of an abnormality in a case where the conditional expression 1407 is not satisfied. Only one determination rule may be set and a determination rule setting step may end. Hereinafter, a case where second and succeeding determination rules are also set will be described.

FIG. 15 shows a screen example in a case where a second type determination rule is set as another type. In the example, a case where the second type determination rule is set as a second determination rule on a second page (a numerical value of the page button 1408 is 2) in the field 1402 of the same screen is shown. In an upper row, #3-#1<50 is set as a conditional expression 1501 based on an operation of the template. The conditional expression defines a relation with a threshold value (in other words, a brightness threshold value) regarding a difference (in order words, deviation) between a brightness value of a reference ROI (first ROI) and a brightness value of a target ROI (second ROI) in the reference cell region 1403. Specifically, the conditional expression 1501 defines that the ROI with the ROI number (#) of 1 is referred to as the reference ROI, the ROI with #=3 is referred to as the target ROI, and the difference in brightness between the reference ROI with #=1 and the target ROI with #=3 is smaller than a threshold value, 50. The conditional expression 1501 corresponds to the second determination rule. The determination rule determines the presence of an abnormality in a case where the conditional expression 1501 is not satisfied.

While the determination rule of the conditional expression 1501 of the example is the rule that the deviation in brightness between the ROIs is smaller than the threshold value, the invention is not limited thereto, and a rule that a difference in brightness between ROIs is greater than a threshold value can be set.

FIG. 16 shows a screen example in a case where a third type determination rule is set as another type. In the example, a case where the third type determination rule is set as a third determination rule on a third page (the numerical value of the page button 1408 is 3) in the field 1402 of the same screen is shown. In an upper row, 100<#1<150 is set as a conditional expression 1601 based on an operation of the template. The conditional expression defines a relation between a brightness value of a target ROI and a range of a threshold value (brightness threshold value) in the reference cell region 1403. Specifically, the conditional expression 1601 defines that, regarding the ROI with the ROI number (#) of 1, the brightness of the ROI is within a range of greater than 100 as a lower limit threshold value and smaller than 150 as an upper limit threshold value. The conditional expression 1601 corresponds to the third determination rule. The determination rule determines the presence of an abnormality in a case where the conditional expression 1601 is not satisfied.

While each type determination rule is the rule that determines the absence of an abnormality in a case where the conditional expression is satisfied and determines the presence of an abnormality in a case where the conditional expression is not satisfied, the invention is not limited thereto, and conversely, a form can be made in which a rule that determines the presence of an abnormality in a case where the conditional expression is satisfied, and determines the absence of an abnormality in a case where the conditional expression is not satisfied is set. After the three determination rules of the above-described examples are set, in a case where the next button is pressed, the user proceeds to the next step (abnormality determination). In a case where a plurality of determination rules are set on the screen, the plurality of determination rules are automatically applied to abnormality determination. An abnormality determination process is executed for each determination rule, and a determination result is generated for each determination rule.

As described above, the user can check and set various determination rules on the determination rule setting screen. In the example, a case where various determination rules are set based on the same GUI is shown. The invention is not limited thereto, and the user may set a determination rule on a different GUI for each type of determination rule. In the example, while a case where three types of abnormality determination are performed using the three types of determination rules is shown, not only the three determination rules of the above-described examples are set simultaneously, but also only the second type or the third type can be set as a determination rule or as described below, abnormality determination can be performed by setting two random determination rules in combination.

The setting examples of the determination rule of FIGS. 14 to 16 described above can be regarded that, on a plurality of regions of interest included in the cell region of the reference image, a relationship (conditional expression 1407, conditional expression 1501, and conditional expression 1601) of brightness between the regions of interest is set.

[Abnormality Determination and Determination Result Output (Steps S6 and S7)]

FIG. 17 shows a screen example of abnormality determination (Step S6 in FIG. 2) and output (Step S7 in FIG. 2) of a determination result. The example of FIG. 17 is an example of a determination result for the observation image of the sample A. In a case where the determination result button 916 is pressed, abnormality determination is performed based on the set determination rule, and a determination result is displayed in a lower field 1701. In the example, abnormality determination is performed for each determination rule using the three determination rules set in the previous step, and a determination result of each determination rule is generated. In the screen example of the FIG. 17, a determination result using the first determination rule (FIG. 14) is displayed on a first page (a numerical value of a page button 1702 is 1) of the field 1701. On the screen, a determination result obtained by combining three determination rules can be displayed.

In the field 1701, similar cell regions 1704 are displayed by, for example, a yellow solid line frame on a target observation image 1703. In addition, a reference cell region may be displayed distinguishingly on the observation image 1703. Though not shown, the content of the reference cell region may be displayed in another field. In addition, in a case where a cell region with an abnormality is detected as a determination result, a cell region 1705 with an abnormality is displayed distinguishingly on the observation image 1703 by, for example, a red solid line frame (in the drawing, shown by a white frame). Accordingly, the user can check a position of a cell where there is an abnormality, in the observation image. The invention is not limited to the display of the presence or absence of an abnormality in units of cell regions, and the presence or absence of an abnormality may be displayed in units of plug regions. In a case where the page button 1702 is operated, transition is made to another page, and other determination results can be checked similarly.

The user can perform a selection operation of a desired cell region where there is an abnormality or there is no abnormality and press an image (Image) button to display the cell region on an enlarged scale and check details. In this case, the reference cell region and the selected cell region may be displayed in parallel inside the screen to allow comparison and check. Furthermore, the user can press a rule (Rule) button to display and check the content of the above-described determination rule corresponding to the determination process of the page. Moreover, the user can press an all storage (All save) button to store all of the reference image, the similar images, the set rules, the determination results, and the like as data. In addition, the user can store only a selected determination result as a result of checking the determination results on the screen. In a case where an operation of storage is made, the processor 201 stores each piece of data stored on the above-described data screen in the storage device 203 in association with determination result data.

A screen example of FIG. 18 is similarly an example of a determination result for the observation image of the sample B. In the sample A and the sample B, processes in other similar flows are performed. In the field 1701, a determination result is displayed on a target observation image 1801. Abnormality determination is performed based on set determination rules, and a determination result of each determination rule is generated. In FIG. 18, the brightness of the background region is shown brightly to be easy to view. The brightness of the background region may be changed to desired brightness by an operation of the user.

In the example, on the first page of the field 1701, the determination result using the first determination rule is displayed. The determination result corresponds to the extraction result of FIG. 8. As a display example of the determination result, based on the reference cell region and the similar cell regions of various disposition patterns, a cell region with no abnormality is displayed by a broken line frame with characters (OK) indicating no abnormality, and a cell region with an abnormality is displayed by a solid line frame with characters (NG) indicating an abnormality. Furthermore, each disposition pattern of the cell region is displayed in a color. As described above (FIG. 6 or 8), for example, the pattern A is displayed in yellow, the pattern B is displayed in orange, the pattern C is displayed in green, and the pattern D is displayed in light blue.

The invention is not limited to identification display, and other display aspects can be made. For example, the reference cell region and other similar cell regions may be displayed distinguishingly. The cell region with an abnormality may be displayed by a red frame, the cell region with no abnormality may be displayed by a predetermined color frame, and the disposition patterns may be distinguished only by characters. The on and off of identification display of the disposition pattern may be switched by a button (not shown). Furthermore, the user may select only a specific disposition pattern by a button (not shown) and may allow only the cell region of the specific disposition pattern (for example, the pattern A) to be displayed.

In the example, as the determination results, a cell 1811 and a cell 1812 are determined as the presence of an abnormality, and some plugs (the plugs 421 and 422 in FIG. 4 or 8) in these cells are determined as the presence of an abnormality. In this way, in the analysis function, the disposition pattern of a plurality of plugs of the cell can be automatically determined and extracted as similar while including a relation of inversion, and displayed. The user can easily perform discrimination of an inverted pattern and abnormality determination in visual observation that are difficult in the related art.

A determination rule obtained by combining a plurality of types of determination rules can be set and applied to abnormality determination. For example, on a certain page of the above-described determination rule setting screen, a first conditional expression corresponding to a first type determination rule is set in a first row, and a second conditional expression corresponding to a second type determination rule is set in a second row via AND or OR logic. Then, a determination rule by a conditional expression configured by combining the first type determination rule and the second type determination rule can be set.

[Multiple Determination]

FIG. 19 shows a screen example of multiple determination in a case where the multiple determination button 917 is pressed. The user can finish work by checking the determination result of FIG. 18, but can further perform multiple determination on the screen of FIG. 19, that is, batch abnormality determination on a plurality of observation images using the same determination rule. On the screen, a region 1902 of a GUI for selecting an observation image file group to be a processing target in a batch is displayed in a field 1901. The user inputs the observation image file group to be a processing target in a batch in the region 1902 of the GUI. Information such as file names of the observation image file group is arranged and displayed in the region 1902. An observation image file can be selected by a select (Select) button. A folder of the observation image file group can be selected by a folder (Folder) button. In a case where an execute (Execute) button is pressed, the processor 201 applies the determination rule set in the previous step to the observation image file group in the region 1902 to perform abnormality determination, generates a determination result for each observation image file, and stores determination result data. The determination result of each observation image file can be checked on the same screen by returning to the previous step of the determination result according to an operation of the determination result button 916.

[Map Display]

FIG. 20 shows a screen example of map display that is displayed in a case where a map (Map) button is pressed on the determination result screen or a multiple determination result screen. A map of the example is generated by integrating a plurality of determination results of a plurality of observation images (in other words, a device region) on the semiconductor device as the sample 5. A map 2002 is displayed in a field 2001 along with information of an object (device) as the sample 5. The map 2002 is a plane having position coordinates of an X axis and a Y axis corresponding to the surface of the sample, and a coordinate origin (Origin of coordinate) is set in advance. The coordinate origin of the device is, in other words, reference coordinates of the device. The coordinates used herein indicate relative coordinates on the device with the origin coordinates of the device as the center or absolute coordinates of the stage of the SEM.

On the plane of the map 2002, a cell region with an abnormality detected as an abnormality determination result is displayed to be identifiable in an aspect such as a frame line, a color, characters, or a mark. In particular, in a case where an inverted disposition pattern is included like the sample B, various disposition patterns are displayed distinguishingly. A cell region with an abnormality is displayed with a predetermined mark or the like (in the example, a red x mark) at a location of an ROI (plug) with an abnormality in the cell region. Furthermore, in the cell region with an abnormality, position coordinate information of (X, Y) in a coordinate system of the map 2002 (that is, a device surface) is also displayed. The position coordinate information is a relative position from a device coordinate origin or an absolute position of the stage of the SEM. In the example, while the position coordinate information is set to, in detail, position coordinate information of an ROI (plug) with an abnormality in the cell region, the invention is not limited thereto, and the position coordinate information can be set to position coordinate information of a center point or the like of a cell region having an ROI (plug) with an abnormality.

The user can check a location with an abnormality, a distribution, or the like in the entire device by viewing such map display understandably. A desired location in the map can be designated and details can be displayed. Furthermore, the map display of each determination rule can be switched by an operation of a page button. The map can be displayed in enlargement or reduction display, scroll display, page display, or the like.

[Method of Automatically Extracting and Setting Reference Cell Region]

In the first embodiment, as described above (Steps S2 to S4), a plurality of ROIs (in particular, brightness or the like) of the suitable reference cell region can be generated, presented, and set based on the extraction (Step S3) of the similar cell regions for the cell region designated by the user. Average brightness or the like can be calculated from a plurality of extracted similar cell regions by a statistical process and can be set as brightness of a plurality of ROIs of the reference cell region. The user can check the reference cell region automatically generated and presented, and as necessary, the user can change and set the reference cell region. Detailed description of such a method will be provided below.

FIG. 21 is an explanatory view of a detailed process example of the first embodiment and shows a part of a screen example in setting a reference cell region. For example, in a field 2101, information for allowing the user to check and set the reference cell region is displayed. In a field 2102, an initial reference cell region, an extraction result of similar cells, and the like are displayed on an observation image.

First, the user designates an initial reference cell region in the observation image on the screen. The designation of the initial reference cell region is temporary, and the reference cell region is confirmed later. The designation may be, for example, designation of surrounding the region from the observation image or may be designation of position coordinates (for example, an upper left point and a lower right point of a rectangle) of the region.

In the field 2101, the user can set a plurality of ROIs in an initial reference cell region 2103. For example, a plug region may be surrounded by an ellipse or may be surrounded by a rectangle. The example shows a case where a plug region is surrounded by an elliptical broken line frame. Position coordinates of an upper left point and a lower right point of a figure surrounding a plug may be designated or position coordinates of the center of gravity or the center of a figure surrounding a plug may be designated.

The designation of the ROI is not limited to a manual operation of the user, and the processor 201 may execute an automatic process to support the designation of the ROI. For example, the processor 201 may estimate and extract a plug region by calculating a brightness distribution using an image processing technique such as binarization from the initial reference cell region designated by the user and may present, to the user, whether to set the extracted plug region as an ROI.

The processor 201 specifies a position relation of a plurality of specified ROIs included in the initial reference cell region and sets the initial reference cell region including the plurality of ROIs as a reference cell region. Alternatively, the user may set the position relation between the ROIs in the specification.

The processor 201 sets a region where the brightness value is equal to or greater than a threshold value, as an ROI using the threshold value of the brightness value to distinguish a plurality of ROIs from the background region (the darkest region of the device). For example, in an initial reference cell region 2104 of the field 2101, three plugs surrounded by red broken line frames are designated. The three plugs are separated from the background region and identified, and are set as three ROIs included in the initial reference cell region.

The initial reference cell region 2104 of the field 2101 shows an example where the position relation of a plurality of ROIs is specified. In the example, as position coordinates of each ROI, position coordinates of the center of an ellipse of a plug region are designated. In a right table, position coordinates are displayed for each ROI number (#). The ROI position coordinates may be absolute position coordinates or may be relative position coordinates with a certain ROI as a reference ROI. As another processing example, a distance (shown by a line segment) between the ROI position coordinates may be set. As another processing example, the size of each ROI, for example, a diameter (shown by an arrow) may be set.

The processor 201 extracts regions similar to the initial reference cell region including a plurality of ROIs as a similar image from the observation image as an entire image based on a preset condition (described as an extraction condition) using the initial reference cell region set in this way and a plurality of ROIs (initial ROIs) included in the initial reference cell region as described above.

In the extraction process, the following may be applied as the extraction condition. For example, the relative position coordinates of each ROI in the initial reference cell region and the size (for example, the diameter) of each ROI are specified in advance. The processor 201 determines and specifies regions similar to the reference cell region (a plurality of ROIs) in order in the entire image and extracts the regions as a similar image. In the determination, extraction condition for determining a relationship between a plurality of ROIs included in the reference cell region is used.

An example of the extraction condition is a condition regarding whether a distance corresponding to the ROI relative position coordinates or a distance corresponding to a difference between the ROI absolute position coordinates is within a threshold value range.

In the extraction condition, for example, in a case where the range is narrowed, the determination of the difference can be performed strictly, and in a case where the range is widened, determination can be performed loosely.

The extraction condition is different from the determination rule in the abnormality determination. In the determination using the extraction condition, there is a need to form a population of an inspection target (sample 5). Even though there is an abnormality in a semiconductor device itself as an inspection target, the semiconductor device needs to be included in the population. Furthermore, a portion that is not an inspection target in the semiconductor device as an inspection target should not be included in the population. That is, in strict determination, an inspection region including an abnormal portion should not leak, and in loose determination, a portion that is not an inspection target should not be included.

In the first embodiment, to confirm the formation of the population early, the extraction process (Step S3) for the setting of the reference cell region and the setting of a plurality of ROIs included in the reference cell region before the setting of the determination rule of subsequent abnormality determination, a check is made on the screen, and the reference cell region including the plurality of ROIs is confirmed. Accordingly, the certainty of specifying the inspection target (target region) can be increased, and subsequent abnormality determination can be performed with high accuracy.

The extraction condition is designed and set in software of the computer system 1 in advance. Alternatively, the extraction condition may be displayed on the screen, and the user may select and change an algorithm or a parameter value to enable user setting using a user setting function of the software. A plurality of templates may be set and prepared in advance such that an extraction condition to be applied or setting information (a reference cell region including a plurality of ROIs, determination rules, and the like) can be easily selected for each client or target device.

In a case where there is less need to perform the specification of the inspection target early, as a modification example, a form may be made in which the extraction process for the setting of the reference cell region and a plurality of ROIs in the reference cell region is automatically executed after the setting of the determination rule of the subsequent abnormality determination.

[Effects and the Like]

As described above, according to the first embodiment, in the computer system 1 that analyzes the VC image (observation image) obtained by the charged particle beam apparatus (SEM), the determination and detection of the abnormality by brightness comparison between the identical or similar structures in the observation image can be easily and efficiently implemented automatically to a certain extent or more without depending on visual observation. The analysis function of the computer system 1 of the first embodiment extracts the similar cell regions based on the relationship between a plurality of plugs (ROI) included in the cell region in the observation image and determines the abnormality in the cell region. As the relationship, the position relation or the brightness relation between the ROIs is determined. According to the first embodiment, also in a VC image of a sample (semiconductor device) having a complicated structure, a location or the like of an abnormality can be specified and detected easily and semi-automatically, in other words, by automating a main process excluding some operations such as setting or an instruction.

According to the first embodiment, various kinds of determination can be performed according to the setting of the determination rule in which the relationship between the ROIs in the cell is defined. According to the first embodiment, in a case where a relative relationship between the ROIs in the cell is defined, patterns can be extracted as similar regardless of the disposition pattern such as vertical inversion. Then, abnormality determination according to the determination rule can be performed on the similar patterns. As a modification example, inverted disposition patterns can be distinguished and abnormality determination can be performed for each disposition pattern. For example, abnormality determination can be performed only on the above-described pattern A.

Modification Example 1: Processing Flow

FIG. 22 shows a flow of a main process by the computer system 1 (in particular, the analysis function) of a modification example (referred to as a first modification example) of the first embodiment, and has Steps S21 to S27. The flow of the modification example of FIG. 22 has a difference from the flow of FIG. 2 in that a setting process is first collectively executed, and thereafter, the extraction process, the determination process, and the output process are executed. That is, the flow of the modification example is the same as in a case where the processes are executed while Step S3 of FIG. 2 is moved after Step S5.

In Step S21, the processor 201 of the computer system 1 receives and acquires the observation image from the main body 3. In Step S22, the processor 201 sets the reference image (reference cell region) in the observation image. In Step S23, the processor 201 sets a plurality of regions of interest (ROIs) in the reference image. In the modification example, specifically, the user manually sets a plurality of ROIs in the reference image. In Step S24, the processor 201 sets the determination rule based on an operation or check of the user on the setting screen.

In Step S25, the processor 201 extracts the similar images (similar cell regions) from the observation image based on the reference image. In Step S26, the processor 201 determines the abnormality of the cell region (in particular, the plug having the ROI) by comparison between the reference image (reference cell region) and the similar images (similar cell regions) based on the determination rule to be applied. In Step S27, the processor 201 displays the determination result on the screen of the GUI, or the like to output the determination result to the user. Also in the modification example of such a flow, the same or similar effects as or to those in the first embodiment are obtained.

With Step S3 of the extraction process of FIG. 2 described above and Step S25 of an extraction process of FIG. 22, the extraction process (S3, S25) can be regarded as a process in which, on the disposition pattern of a plurality of regions of interest of the reference image, the same disposition pattern and each type of inverted disposition pattern are extracted as similar by calculating a position relation between the regions of interest.

Second Modification: ROI Size

In another modification example (referred to as a second modification example), the size is determined on a plurality of ROIs in the reference image. A relation regarding the size of the ROI can be set as one of the determination rules. The processor 201 performs abnormality determination using the determination rule.

FIG. 23 shows an example where a rule regarding a ROI size is set in a screen example of determination rule setting in the modification example. The user can set a rule (a relation of the size of each ROI or between the ROIs) that compares the size of each ROI in the reference cell region, as a conditional expression on the screen. For example, a rule that determines an ROI having the ROI size outside a given range (or within the range) indicated by a threshold value as an abnormality can be set. In the modification example, for example, as shown in a template 2303 of a third row, the size of the ROI can be selected and set in items of the template.

In the setting example of the determination rule of FIG. 23, a conditional expression 2301 of a first row sets a relationship by comparison of a diameter of the size of each ROI (#1, #2, #3) in the reference cell region. For example, a relationship that a diameter (major axis) of an elliptical region of the ROI with the ROI number (#)=1 is greater than the diameter of the ROI with #=2 and is smaller than the diameter of the ROI with #=3 is defined. In the example, while the ROI region is an ellipse and the major axis of the ellipse is used as the size (similarly to FIG. 21), the invention is not limited thereto, and the minor axis, the area of the ellipse, or the like may be used.

A conditional expression 2302 of a second row sets a range of a threshold value (size threshold value) on the size of the ROI with #=1. In the example, an AND condition between the conditional expression 2301 and the conditional expression 2302 is established. For example, a relationship that the diameter (major axis) of the ROI with #=1 is greater than 100 (lower limit threshold value) and smaller than 150 (upper limit threshold value) is defined. Each threshold value is the diameter (major axis). In a case where a threshold value range is narrowed, the determination of the difference can be detected strictly. In a case where the threshold value range is widened, determination can be performed loosely.

As another example, in a case where the diameter is reduced and an upper threshold value of an inequality is eliminated (for example, 10<#1), determination can be performed while permitting various sizes on the ROI with #=1. Note that, in a case where the size of the ROI with #=1 becomes large, the comparison of the size between the ROI with #=3 and the ROI with #=1 is affected in relation (AND condition) with the conditional expression 2301 of the first row. In this way, in the modification example, the relationship regarding the size between a plurality of ROIs can be flexibly set as the determination rule. Furthermore, a determination rule in which a condition such as brightness is combined with the condition of the size can be set.

The setting of the determination rule of FIG. 23 can be regarded that, on a plurality of regions of interest included in the cell region of the reference image, the relationship (conditional expression 2301 or conditional expression 2302) of the shape or size between the regions of interest is set.

The setting of the determination rule of FIGS. 14 to 16 and 23 can be regarded that, on a plurality of regions of interest included in the cell region of the reference image, the relationship (brightness, shape, or size) between the regions of interest is set.

While the embodiment of the disclosure has been specifically described above, the invention is not limited to the above-described embodiment and can be modified in various forms without departing from the scope of the invention. In the above-described embodiment, components can be added, deleted, or replaced except for essential components. Each embodiment or the modification examples can also be combined.

In the above-described example, while the sample 5 as an observation target has been described as observation of a semiconductor device, the invention is not limited thereto. For example, with application to composition observation of materials or tissue observation of living things, a plurality of regions of interest as a reference cell region are collected from among similar structures in the observation image, and a relationship between a plurality of regions of interest is compared based on a rule in which a relationship between a plurality of regions of interest is defined, also in an image of a sample having a complicated structure. Accordingly, a location of an abnormality, or the like can be specified and detected easily and self-automatically, in other words, by automating a main process excluding some operations such as setting or an instruction.

REFERENCE SIGNS LIST

1: computer system
2: charged particle beam apparatus
3: main body
5: sample
150: image signal (observation image)
201: processor
202: memory

The invention claimed is:

1. A computer system that analyzes an observation image of a semiconductor sample by a charged particle beam apparatus,
wherein the observation image includes a plurality of semiconductor cell regions, and wherein each semiconductor cell region includes a plurality of regions that are elements configuring the semiconductor cell region, and
the computer system executes,
an extraction process of extracting, based on a reference image, one or more second semiconductor cell regions as an extracted image from the observation image, the reference image being a first semiconductor cell region designated by a user or automatically set
a determination process of evaluating, based on a rule that defines a relational condition among a plurality of plug regions included in the reference image, whether the relational condition is satisfied in a plurality of plug regions in the extracted image to determine presence or absence of an abnormality of a semiconductor cell region of the extracted image, and
an output process of outputting, to the user, a position of each semiconductor cell region and the presence or absence of the abnormality as a determination result, wherein a setting process of setting the plurality of plug regions of the reference image based on an operation input of the user or an automatic process is executed,
the extraction process is a process of calculating a position relation between the plug regions on a disposition pattern of the plurality of plug regions of the reference image to extract the same disposition pattern and each type of inverted disposition pattern,
the determination process is a process of calculating a brightness relation between the plug regions in the semiconductor cell region on the image having each type of disposition pattern to determine the presence or absence of the abnormality, and
the output process is a process of outputting the determination result in an aspect in which each type of extracted disposition pattern is identifiable.

2. The computer system according to claim 1,
wherein, in the rule, a relationship of brightness between the plug regions is set on the plurality of plug regions included in the semiconductor cell region of the reference image.

3. The computer system according to claim 1,
wherein, in the rule, a relationship of a shape or a size between the plug regions is set on the plurality of plug regions included in the semiconductor cell region of the reference image.

4. The computer system according to claim 1,
wherein a setting process of setting the plurality of plug regions of the reference image based on an operation input of the user or an automatic process is executed on a screen, and
the setting process includes a process of defining, as the rule, a rule in which a magnitude relation of brightness between the plug regions is defined on a plurality of plug regions in a first semiconductor cell region of the reference image.

5. The computer system according to claim 1,
wherein a setting process of setting the plurality of plug regions of the reference image based on an operation input of the user or an automatic process is executed on a screen, and
the setting process includes a process of setting, as the rule, a rule in which, on a plurality of plug regions in a first semiconductor cell region of the reference image, in a case where a difference in brightness between a designated first region of interest and a second region of interest is equal to or greater than a threshold value, the presence of the abnormality is defined.

6. The computer system according to claim 1,
wherein a setting process of setting the plurality of plug regions of the reference image based on an operation input of the user or an automatic process is executed on a screen, and
the setting process includes a process of setting, as the rule, a rule in which, on a plurality of plug regions in a first semiconductor cell region of the reference image, in a case where a brightness value of a designated region of interest is outside a designated brightness threshold value range, the presence of the abnormality is defined.

7. An analysis method in a computer system that analyzes an observation image of a semiconductor sample by a charged particle beam apparatus,
wherein the observation image includes a plurality of semiconductor cell regions, and wherein each semiconductor cell region includes a plurality of plug regions that are elements configuring the semiconductor cell region, and
the analysis method comprising as steps executed by the computer system:
an extraction process step of extracting, based on a reference image, one or more second semiconductor cell regions as an extracted image from the observation image, the reference image being a first semiconductor cell region designated by a user or automatically set,
a determination process step of evaluating, based on a rule that defines a relational condition among a plurality of plug regions included in the reference image, whether the relational condition is satisfied in a plurality of plug regions in the extracted image to determine presence or absence of an abnormality of a semiconductor cell region of the extracted image; and
an output process step of outputting, to the user, a position of each semiconductor cell region and the presence or absence of the abnormality as a determination result, wherein a setting process of setting the plurality of plug regions of the reference image based on an operation input of the user or an automatic process is executed, the extraction process is a process of calculating a position relation between the plug regions on a disposition pattern of the plurality of plug regions of the reference image to extract the same disposition pattern and each type of inverted disposition pattern, the determination process is a process of calculating a brightness relation between the plug regions in the semiconductor cell region on the image having each type of disposition pattern to determine the presence or absence of the abnormality, and the output process is a process of outputting the determination result in an aspect in which each type of extracted disposition pattern is identifiable.

* * * * *